(12) United States Patent
Chishti et al.

(10) Patent No.: US 9,426,296 B2
(45) Date of Patent: Aug. 23, 2016

(54) SYSTEMS AND METHODS FOR ROUTING CALLERS TO AN AGENT IN A CONTACT CENTER

(71) Applicant: Afiniti International Holdings Ltd., Hamilton (BM)

(72) Inventors: Zia Chishti, Washington, DC (US); Stuart J. Spottiswoode, Beverly Hills, CA (US); Christopher W. Jones, Houston, TX (US)

(73) Assignee: Afiniti International Holdings, Ltd., Hamilton (BM)

( * ) Notice: Subject to any disclaimer, the term of this patent is extended or adjusted under 35 U.S.C. 154(b) by 0 days.

(21) Appl. No.: 14/702,663

(22) Filed: May 1, 2015

(65) Prior Publication Data

US 2015/0237213 A1    Aug. 20, 2015

Related U.S. Application Data

(63) Continuation of application No. 12/021,251, filed on Jan. 28, 2008.

(51) Int. Cl.
*H04M 3/523* (2006.01)
*H04M 3/51* (2006.01)

(52) U.S. Cl.
CPC .......... *H04M 3/5236* (2013.01); *H04M 3/5158* (2013.01); *H04M 3/5183* (2013.01); *H04M 3/5232* (2013.01); *H04M 3/5238* (2013.01)

(58) Field of Classification Search
None
See application file for complete search history.

(56) References Cited

U.S. PATENT DOCUMENTS

| | | | |
|---|---|---|---|
| 5,155,763 | A | 10/1992 | Bigus et al. |
| 5,206,903 | A | 4/1993 | Kohler et al. |
| 5,327,490 | A | 7/1994 | Cave |
| 5,537,470 | A | 7/1996 | Lee |
| 5,702,253 | A | 12/1997 | Bryce et al. |
| 5,825,869 | A | 10/1998 | Brooks et al. |
| 5,903,641 | A | 5/1999 | Tonisson |
| 5,926,538 | A | 7/1999 | Deryugin et al. |
| 6,049,603 | A | 4/2000 | Schwartz et al. |

(Continued)

FOREIGN PATENT DOCUMENTS

| | | |
|---|---|---|
| AU | 2008349500 C1 | 5/2014 |
| AU | 2009209317 B2 | 5/2014 |

(Continued)

OTHER PUBLICATIONS

Anonymous. (2006) "Performance Based Routing in Profit Call Centers," The Decision Makers' Direct, located at www.decisioncraft.com, Issue Jan. 6, 2012 (3 pages).

(Continued)

*Primary Examiner* — Harry S Hong
(74) *Attorney, Agent, or Firm* — Wilmer Cutler Pickering Hale and Dorr LLP

(57) ABSTRACT

Techniques for handling contacts and agents in a contact center system are disclosed. In one particular embodiment, the techniques may be realized as a method for handling contacts and agents in a contact center system including identifying a plurality of contacts ordered for assignment to a plurality of agents, and assigning a first out-of-order contact from the plurality of contacts to a first agent of the plurality of agents who becomes available for assignment to any contact of the plurality of contacts based on information about the first agent.

20 Claims, 7 Drawing Sheets

(56) References Cited

U.S. PATENT DOCUMENTS

| | | | |
|---|---|---|---|
| 6,052,460 A | 4/2000 | Fisher et al. | |
| 6,064,731 A | 5/2000 | Flockhart et al. | |
| 6,088,444 A * | 7/2000 | Walker | H04Q 3/64 379/266.02 |
| 6,163,607 A | 12/2000 | Bogart et al. | |
| 6,222,919 B1 | 4/2001 | Hollatz et al. | |
| 6,292,555 B1 | 9/2001 | Okamoto | |
| 6,324,282 B1 | 11/2001 | McIllwaine et al. | |
| 6,333,979 B1 | 12/2001 | Bondi et al. | |
| 6,389,132 B1 | 5/2002 | Price | |
| 6,389,400 B1 | 5/2002 | Bushey et al. | |
| 6,408,066 B1 | 6/2002 | Andruska et al. | |
| 6,411,687 B1 | 6/2002 | Bohacek et al. | |
| 6,424,709 B1 | 7/2002 | Doyle et al. | |
| 6,434,230 B1 | 8/2002 | Gabriel | |
| 6,496,580 B1 | 12/2002 | Chack | |
| 6,504,920 B1 | 1/2003 | Okon et al. | |
| 6,519,335 B1 | 2/2003 | Bushnell | |
| 6,535,601 B1 * | 3/2003 | Flockhart | H04M 3/5233 379/265.05 |
| 6,570,980 B1 * | 5/2003 | Baruch | H04M 3/523 379/265.12 |
| 6,587,556 B1 | 7/2003 | Judkins et al. | |
| 6,603,854 B1 | 8/2003 | Judkins et al. | |
| 6,639,976 B1 | 10/2003 | Shellum et al. | |
| 6,661,889 B1 | 12/2003 | Flockhart et al. | |
| 6,704,410 B1 | 3/2004 | McFarlane et al. | |
| 6,707,904 B1 | 3/2004 | Judkins et al. | |
| 6,714,643 B1 | 3/2004 | Gargeya et al. | |
| 6,763,104 B1 | 7/2004 | Judkins et al. | |
| 6,774,932 B1 | 8/2004 | Ewing et al. | |
| 6,775,378 B1 | 8/2004 | Villena et al. | |
| 6,798,876 B1 | 9/2004 | Bala | |
| 6,829,348 B1 | 12/2004 | Schroeder et al. | |
| 6,832,203 B1 | 12/2004 | Villena et al. | |
| 6,859,529 B2 | 2/2005 | Duncan et al. | |
| 6,922,466 B1 | 7/2005 | Peterson et al. | |
| 6,937,715 B2 | 8/2005 | Delaney | |
| 6,956,941 B1 | 10/2005 | Duncan et al. | |
| 6,970,821 B1 | 11/2005 | Shambaugh et al. | |
| 6,978,006 B1 | 12/2005 | Polcyn | |
| 7,023,979 B1 | 4/2006 | Wu et al. | |
| 7,039,166 B1 | 5/2006 | Peterson et al. | |
| 7,050,566 B2 | 5/2006 | Becerra et al. | |
| 7,050,567 B1 | 5/2006 | Jensen | |
| 7,062,031 B2 | 6/2006 | Becerra et al. | |
| 7,068,775 B1 * | 6/2006 | Lee | H04M 3/428 379/265.02 |
| 7,092,509 B1 | 8/2006 | Mears et al. | |
| 7,103,172 B2 | 9/2006 | Brown et al. | |
| 7,158,628 B2 | 1/2007 | McConnell et al. | |
| 7,184,540 B2 | 2/2007 | Dezonno et al. | |
| 7,209,549 B2 | 4/2007 | Reynolds et al. | |
| 7,231,032 B2 | 6/2007 | Nevman et al. | |
| 7,231,034 B1 | 6/2007 | Rikhy et al. | |
| 7,236,584 B2 | 6/2007 | Torba | |
| 7,245,716 B2 | 7/2007 | Brown et al. | |
| 7,245,719 B2 | 7/2007 | Kawada et al. | |
| 7,266,251 B2 | 9/2007 | Rowe | |
| 7,269,253 B1 | 9/2007 | Wu et al. | |
| 7,398,224 B2 | 7/2008 | Cooper | |
| 7,593,521 B2 | 9/2009 | Becerra et al. | |
| 7,676,034 B1 | 3/2010 | Wu et al. | |
| 7,725,339 B1 | 5/2010 | Aykin | |
| 7,734,032 B1 | 6/2010 | Kiefhaber et al. | |
| 7,826,597 B2 | 11/2010 | Berner et al. | |
| 7,864,944 B2 | 1/2011 | Khouri et al. | |
| 7,899,177 B1 | 3/2011 | Bruening et al. | |
| 7,916,858 B1 | 3/2011 | Heller et al. | |
| 7,940,917 B2 | 5/2011 | Lauridsen et al. | |
| 7,961,866 B1 | 6/2011 | Boutcher et al. | |
| 7,995,717 B2 | 8/2011 | Conway et al. | |
| 8,000,989 B1 | 8/2011 | Kiefhaber et al. | |
| 8,010,607 B2 | 8/2011 | McCormack et al. | |
| 8,094,790 B2 | 1/2012 | Conway et al. | |
| 8,126,133 B1 | 2/2012 | Everingham et al. | |
| 8,140,441 B2 | 3/2012 | Cases et al. | |
| 8,175,253 B2 | 5/2012 | Knott et al. | |
| 8,229,102 B2 | 7/2012 | Knott et al. | |
| 8,249,245 B2 | 8/2012 | Jay et al. | |
| 8,295,471 B2 | 10/2012 | Spottiswoode et al. | |
| 8,300,798 B1 | 10/2012 | Wu et al. | |
| 8,359,219 B2 | 1/2013 | Chishti et al. | |
| 8,433,597 B2 | 4/2013 | Chishti et al. | |
| 8,472,611 B2 | 6/2013 | Chishti | |
| 8,565,410 B2 | 10/2013 | Chishti et al. | |
| 8,634,542 B2 | 1/2014 | Spottiswoode et al. | |
| 8,644,490 B2 | 2/2014 | Stewart | |
| 8,670,548 B2 | 3/2014 | Xie et al. | |
| 8,699,694 B2 | 4/2014 | Chishti et al. | |
| 8,712,821 B2 | 4/2014 | Spottiswoode | |
| 8,718,271 B2 | 5/2014 | Spottiswoode | |
| 8,724,797 B2 | 5/2014 | Chishti et al. | |
| 8,731,178 B2 | 5/2014 | Chishti et al. | |
| 8,737,595 B2 | 5/2014 | Chishti et al. | |
| 8,750,488 B2 | 6/2014 | Spottiswoode et al. | |
| 8,781,100 B2 | 7/2014 | Spottiswoode et al. | |
| 8,781,106 B2 | 7/2014 | Afzal | |
| 8,792,630 B2 | 7/2014 | Chishti et al. | |
| 8,824,658 B2 | 9/2014 | Chishti | |
| 8,879,715 B2 | 11/2014 | Spottiswoode et al. | |
| 8,903,079 B2 | 12/2014 | Xie et al. | |
| 8,929,537 B2 | 1/2015 | Chishti et al. | |
| 8,995,647 B2 | 3/2015 | Li et al. | |
| 9,020,137 B2 | 4/2015 | Chishti et al. | |
| 9,025,757 B2 | 5/2015 | Spottiswoode et al. | |
| 2001/0032120 A1 | 10/2001 | Stuart et al. | |
| 2002/0018554 A1 | 2/2002 | Jensen et al. | |
| 2002/0046030 A1 | 4/2002 | Haritsa et al. | |
| 2002/0082736 A1 | 6/2002 | Lech et al. | |
| 2002/0110234 A1 | 8/2002 | Walker et al. | |
| 2002/0111172 A1 | 8/2002 | DeWolf et al. | |
| 2002/0131399 A1 * | 9/2002 | Philonenko | H04L 29/06 370/351 |
| 2002/0138285 A1 | 9/2002 | DeCotiis et al. | |
| 2002/0143599 A1 | 10/2002 | Nourbakhsh et al. | |
| 2002/0161765 A1 | 10/2002 | Kundrot et al. | |
| 2002/0196845 A1 | 12/2002 | Richards et al. | |
| 2003/0002653 A1 | 1/2003 | Uckun | |
| 2003/0081757 A1 | 5/2003 | Mengshoel et al. | |
| 2003/0095652 A1 | 5/2003 | Mengshoel et al. | |
| 2003/0169870 A1 | 9/2003 | Stanford | |
| 2003/0174830 A1 | 9/2003 | Boyer et al. | |
| 2003/0217016 A1 | 11/2003 | Pericle | |
| 2004/0028211 A1 | 2/2004 | Culp et al. | |
| 2004/0057416 A1 | 3/2004 | McCormack | |
| 2004/0096050 A1 | 5/2004 | Das et al. | |
| 2004/0101127 A1 | 5/2004 | Dezonno et al. | |
| 2004/0109555 A1 | 6/2004 | Williams | |
| 2004/0133434 A1 | 7/2004 | Szlam et al. | |
| 2004/0210475 A1 | 10/2004 | Starnes et al. | |
| 2004/0230438 A1 | 11/2004 | Pasquale et al. | |
| 2004/0267816 A1 | 12/2004 | Russek | |
| 2005/0013428 A1 | 1/2005 | Walters | |
| 2005/0043986 A1 | 2/2005 | McConnell et al. | |
| 2005/0047581 A1 | 3/2005 | Shaffer et al. | |
| 2005/0047582 A1 | 3/2005 | Shaffer et al. | |
| 2005/0129212 A1 | 6/2005 | Parker | |
| 2005/0135593 A1 | 6/2005 | Becerra et al. | |
| 2005/0135596 A1 | 6/2005 | Zhao | |
| 2005/0187802 A1 | 8/2005 | Koeppel | |
| 2005/0195960 A1 | 9/2005 | Shaffer et al. | |
| 2005/0286709 A1 | 12/2005 | Horton et al. | |
| 2006/0098803 A1 | 5/2006 | Bushey et al. | |
| 2006/0110052 A1 | 5/2006 | Finlayson | |
| 2006/0124113 A1 | 6/2006 | Roberts | |
| 2006/0184040 A1 | 8/2006 | Keller et al. | |
| 2006/0222164 A1 | 10/2006 | Contractor et al. | |
| 2006/0233346 A1 | 10/2006 | McIlwaine et al. | |
| 2006/0262918 A1 | 11/2006 | Karnalkar et al. | |
| 2006/0262922 A1 | 11/2006 | Margulies et al. | |
| 2007/0036323 A1 | 2/2007 | Travis | |
| 2007/0071222 A1 | 3/2007 | Flockhart et al. | |
| 2007/0121602 A1 | 5/2007 | Sin et al. | |

(56) References Cited

U.S. PATENT DOCUMENTS

| | | |
|---|---|---|
| 2007/0121829 A1 | 5/2007 | Tal et al. |
| 2007/0154007 A1 | 7/2007 | Bernhard |
| 2007/0174111 A1 | 7/2007 | Anderson et al. |
| 2007/0198322 A1 | 8/2007 | Bourne et al. |
| 2007/0274502 A1 | 11/2007 | Brown |
| 2008/0002823 A1 | 1/2008 | Fama et al. |
| 2008/0008309 A1 | 1/2008 | Dezonno et al. |
| 2008/0046386 A1 | 2/2008 | Pieraccinii et al. |
| 2008/0065476 A1 | 3/2008 | Klein et al. |
| 2008/0152122 A1 | 6/2008 | Idan et al. |
| 2008/0181389 A1 | 7/2008 | Bourne et al. |
| 2008/0199000 A1 | 8/2008 | Su et al. |
| 2008/0267386 A1 | 10/2008 | Cooper |
| 2008/0273687 A1 | 11/2008 | Knott et al. |
| 2009/0043670 A1 | 2/2009 | Johansson et al. |
| 2009/0086933 A1 | 4/2009 | Patel et al. |
| 2009/0190740 A1 | 7/2009 | Chishti et al. |
| 2009/0190743 A1 | 7/2009 | Spottiswoode |
| 2009/0190744 A1 | 7/2009 | Xie et al. |
| 2009/0190745 A1 | 7/2009 | Xie et al. |
| 2009/0190746 A1 | 7/2009 | Chishti et al. |
| 2009/0190747 A1 | 7/2009 | Spottiswoode |
| 2009/0190748 A1 | 7/2009 | Chishti et al. |
| 2009/0190749 A1 | 7/2009 | Xie et al. |
| 2009/0190750 A1 | 7/2009 | Xie et al. |
| 2009/0232294 A1 | 9/2009 | Xie et al. |
| 2009/0234710 A1 | 9/2009 | Belgaied Hassine et al. |
| 2009/0246493 A1 | 10/2009 | Hirose et al. |
| 2009/0304172 A1 | 12/2009 | Becerra et al. |
| 2009/0318111 A1 | 12/2009 | Desai et al. |
| 2009/0323921 A1 | 12/2009 | Spottiswoode et al. |
| 2010/0020959 A1 | 1/2010 | Spottiswoode |
| 2010/0020961 A1 | 1/2010 | Spottiswoode |
| 2010/0054431 A1 | 3/2010 | Jaiswal et al. |
| 2010/0054452 A1 | 3/2010 | Afzal |
| 2010/0054453 A1 | 3/2010 | Stewart |
| 2010/0086120 A1 | 4/2010 | Brussat et al. |
| 2010/0111285 A1 | 5/2010 | Chishti |
| 2010/0111286 A1 | 5/2010 | Chishti |
| 2010/0111287 A1 | 5/2010 | Xie et al. |
| 2010/0111288 A1 | 5/2010 | Afzal et al. |
| 2010/0142698 A1 | 6/2010 | Spottiswoode et al. |
| 2010/0183138 A1 | 7/2010 | Spottiswoode et al. |
| 2011/0022357 A1 | 1/2011 | Vock et al. |
| 2011/0031112 A1 | 2/2011 | Birang et al. |
| 2011/0069821 A1 | 3/2011 | Korolev et al. |
| 2011/0125048 A1 | 5/2011 | Causevic et al. |
| 2012/0051536 A1 | 3/2012 | Chishti et al. |
| 2012/0051537 A1 | 3/2012 | Chishti et al. |
| 2012/0224680 A1 | 9/2012 | Spottiswoode et al. |
| 2012/0278136 A1 | 11/2012 | Flockhart et al. |
| 2013/0003959 A1 | 1/2013 | Nishikawa et al. |
| 2014/0044246 A1 | 2/2014 | Klemm et al. |
| 2014/0079210 A1 | 3/2014 | Kohler et al. |
| 2014/0119531 A1 | 5/2014 | Tuchman et al. |
| 2015/0055772 A1 | 2/2015 | Klemm et al. |

FOREIGN PATENT DOCUMENTS

| | | |
|---|---|---|
| AU | 2009311534 B2 | 8/2014 |
| CN | 102301688 B | 5/2014 |
| CN | 102017591 B | 11/2014 |
| EP | 0 493 292 A2 | 7/1992 |
| EP | 0 949 793 A1 | 10/1999 |
| EP | 1 032 188 A1 | 8/2000 |
| JP | 11-098252 A | 4/1999 |
| JP | 2000-078292 A | 3/2000 |
| JP | 2000-092213 A | 3/2000 |
| JP | 2000-236393 A | 8/2000 |
| JP | 2001-292236 A | 10/2001 |
| JP | 2001-518753 A | 10/2001 |
| JP | 2002-297900 A | 10/2002 |
| JP | 3366565 B2 | 1/2003 |
| JP | 2003-187061 A | 7/2003 |
| JP | 2004-056517 A | 2/2004 |
| JP | 2004-227228 A | 8/2004 |
| JP | 2006-345132 A | 12/2006 |
| JP | 2007-324708 A | 12/2007 |
| JP | 5421928 B2 | 2/2014 |
| JP | 5631326 B2 | 11/2014 |
| JP | 5649575 B2 | 1/2015 |
| MX | 316118 | 12/2013 |
| MX | 322251 | 7/2014 |
| NZ | 587100 | 10/2013 |
| NZ | 587101 | 10/2013 |
| NZ | 591486 | 1/2014 |
| NZ | 592781 | 3/2014 |
| PH | 1-2010-501704 | 2/2014 |
| PH | 1-2010-501705 | 2/2015 |
| WO | WO-99/17517 A1 | 4/1999 |
| WO | WO-01/63894 A2 | 8/2001 |
| WO | WO-2006/124113 A2 | 11/2006 |
| WO | WO-2010/053701 A2 | 5/2010 |
| WO | WO-2011/081514 A1 | 7/2011 |

OTHER PUBLICATIONS

Cleveland, William S., "Robust Locally Weighted Regression and Smoothing Scatterplots," Journal of the American Statistical Association, vol. 74, No. 368, pp. 829-836 (Dec. 1979).

Gans, N. et al. (2003), "Telephone Call Centers: Tutorial, Review and Research Prospects," Manufacturing & Service Operations Management, vol. 5, No. 2, pp. 79-141.

International Preliminary Report on Patentability issued in connection with PCT Application No. PCT/US2009/066254 mailed Jun. 14, 2011 (6 pages).

International Search Report issued in connection with International Application No. PCT/US13/33268 mailed May 31, 2013 (2 pages).

International Search Report issued in connection with PCT Application No. PCT/US/2009/054352 mailed Mar. 12, 2010, 5 pages.

International Search Report issued in connection with PCT Application No. PCT/US2008/077042 mailed Mar. 13, 2009 (3 pages).

International Search Report issued in connection with PCT Application No. PCT/US2009/031611 mailed Jun. 3, 2009 (5 pages).

International Search Report issued in connection with PCT Application No. PCT/US2009/066254 mailed Feb. 24, 2010 (4 pages).

International Search Report issued in connection with PCT/US2009/061537 mailed Jun. 7, 2010 (5 pages).

International Search Report issued in connection with PCT/US2013/033261 mailed Jun. 14, 2013 (3 pages).

International Search Report issued in connection with PCT/US2013/33265 mailed Jul. 9, 2013 (2 pages).

Koole, G. (2004). "Performance Analysis and Optimization in Customer Contact Centers," Proceedings of the Quantitative Evaluation of Systems, First International Conference, Sep. 27-30, 2004 (4 pages).

Koole, G. et al. (Mar. 6, 2006). "An Overview of Routing and Staffing Algorithms in Multi-Skill Customer Contact Centers," Manuscript, 42 pages.

Ntzoufras, "Bayesian Modeling Using Winbugs". Wiley Interscience, Chapter 5, Normal Regression Models, Oct. 18, 2007, pp. 155-220 (67 pages).

Press, W. H. and Rybicki, G. B., "Fast Algorithm for Spectral Analysis of Unevenly Sampled Data," The Astrophysical Journal, vol. 338, pp. 277-280 (Mar. 1, 1989).

Riedmiller, M. et al. (1993). "A Direct Adaptive Method for Faster Back Propagation Learning: The RPROP Algorithm," 1993 IEEE International Conference on Neural Networks, San Francisco, CA, Mar. 28-Apr. 1, 1993, 1:586-591.

Stanley et al., "Improving call center operations using performance-based routing strategies," Calif. Journal of Operations Management, 6(1), 24-32, Feb. 2008; retrieved from http://userwww.sfsu.edu/saltzman/Publist.html.

Subsequent Substantive Examination Report issued in connection with Philippines Application No. 1-2010-501705 mailed Jul. 14, 2014 (1 page).

(56) References Cited

OTHER PUBLICATIONS

Substantive Examination Report issued in connection with Philippines Application No. 1/2011/500868 dated May 2, 2014 (1 page).
Written Opinion of the International Searching Authority issued in connection with PCT Application No. PCT/US2008/077042 mailed Mar. 13, 2009, 6 pages.
Written Opinion of the International Searching Authority issued in connection with International Application No. PCT/US13/33268 mailed May 31, 2013, 7 pages.
Written Opinion of the International Searching Authority issued in connection with PCT Application No. PCT/US/2009/054352 mailed Mar. 12, 2010, 5 pages.
Written Opinion of the International Searching Authority issued in connection with PCT Application No. PCT/US2009/031611 mailed Jun. 3, 2009, 7 pages.
Written Opinion of the International Searching Authority issued in connection with PCT Application No. PCT/US2009/066254 mailed Feb. 4, 2010, 5 pages.
Written Opinion of the International Searching Authority issued in connection with PCT/US2009/061537 mailed Jun. 7, 2010, 10 pages.
Written Opinion of the International Searching Authority issued in connection with PCT/US2013/033261 mailed Jun. 14, 2013, 7 pages.
Written Opinion of the International Searching Authority issued in connection with PCT/US2013/33265 mailed Jul. 9, 2013, 7 pages.

* cited by examiner

SYSTEMS AND METHODS FOR ROUTING CALLERS TO AN AGENT IN A CONTACT CENTER

CROSS-REFERENCE TO RELATED PATENT APPLICATIONS

This application is a continuation of U.S. patent application Ser. No. 12/021,251, filed Jan. 28, 2008, which is incorporated herein by reference in its entirety as if fully set forth herein.

BACKGROUND OF THE INVENTION

The present invention relates to the field of routing phone calls and other telecommunications in a contact center system.

The typical contact center consists of a number of human agents, with each assigned to a telecommunication device, such as a phone or a computer for conducting email or Internet chat sessions, that is connected to a central switch. Using these devices, the agents are generally used to provide sales, customer service, or technical support to the customers or prospective customers of a contact center or a contact center's clients.

Typically, a contact center or client will advertise to its customers, prospective customers, or other third parties a number of different contact numbers or addresses for a particular service, such as for billing questions or for technical support. The customers, prospective customers, or third parties seeking a particular service will then use this contact information, and the incoming caller will be routed at one or more routing points to a human agent at a contact center who can provide the appropriate service. Contact centers that respond to such incoming contacts are referred to as "inbound contact centers."

Similarly, a contact center can make outgoing contacts to current or prospective customers or third parties. Such contacts may be made to encourage sales of a product, provide technical support or billing information, survey consumer preferences, or to assist in collecting debts. Contact centers that make such outgoing contacts are referred to as "outbound contact centers."

In both inbound contact centers and outbound contact centers, the individuals (such as customers, prospective customers, survey participants, or other third parties) that interact with contact center agents over the telephone are referred to in this application as a "caller." The individuals acquired by the contact center to interact with callers are referred to in this application as an "agent."

An essential piece of hardware for any contact center operation is the switch system that connects callers to agents. In an inbound contact center, these switches route incoming callers to a particular agent in a contact center, or, if multiple contact centers are deployed, to a particular contact center for further routing. In an outbound contact center employing telephone devices, dialers are typically employed in addition to a switch system. The dialer is used to automatically dial a phone number from a list of phone numbers, and to determine whether a live caller has been reached from the phone number called (as opposed to obtaining no answer, a busy signal, an error message, or an answering machine). When the dialer obtains a live caller, the switch system routes the caller to a particular agent in the contact center.

Routing technologies have accordingly been developed to optimize the caller experience. For example, U.S. Pat. No. 7,236,584 describes a telephone system for equalizing caller waiting times across multiple telephone switches, regardless of the general variations in performance that may exist among those switches. Contact routing in an inbound contact center, however, is a process that is generally structured to connect callers to agents that have been idle for the longest period of time. In the case of an inbound caller where only one agent may be available, that agent is generally selected for the caller without further analysis. In another example, if there are eight agents at a contact center, and seven are occupied with contacts, the switch will generally route the inbound caller to the one agent that is available. If all eight agents are occupied with contacts, the switch will typically put the contact on hold and then route it to the next agent that becomes available. More generally, the contact center will set up a queue of incoming callers and preferentially route the longest-waiting callers to the agents that become available over time. Such a pattern of routing contacts to either the first available agent or the longest-waiting agent is referred to as "round-robin" contact routing. In round robin contact routing, eventual matches and connections between a caller and an agent are essentially random.

In an outbound contact center environment using telephone devices, the contact center or its agents are typically provided a "lead list" comprising a list of telephone numbers to be contacted to attempt some solicitation effort, such as attempting to sell a product or conduct a survey. The lead list can be a comprehensive list for all contact centers, one contact center, all agents, or a sub-list for a particular agent or group of agents (in any such case, the list is generally referred to in this application as a "lead list"). After receiving a lead list, a dialer or the agents themselves will typically call through the lead list in numerical order, obtain a live caller, and conduct the solicitation effort. In using this standard process, the eventual matches and connections between a caller and an agent are essentially random.

Some attempts have been made to improve upon these standard yet essentially random processes for connecting a caller to an agent. For example, U.S. Pat. No. 7,209,549 describes a telephone routing system wherein an incoming caller's language preference is collected and used to route their telephone call to a particular contact center or agent that can provide service in that language. In this manner, language preference is the primary driver of matching and connecting a caller to an agent, although once such a preference has been made, callers are almost always routed in "round-robin" fashion.

Other attempts have been made to alter the general round-robin system. For example, U.S. Pat. No. 7,231,032 describes a telephone system wherein the agents themselves each create personal routing rules for incoming callers, allowing each agent to customize the types of callers that are routed to them. These rules can include a list of particular callers the agent wants routed to them, such as callers that the agent has interacted with before. This system, however, is skewed towards the agent's preference and does not take into account the relative capabilities of the agents nor the individual characteristics of the callers and the agents themselves.

There is thus a need for improving on the available mechanisms for matching and connecting a caller to an agent. The present invention accomplishes this.

SUMMARY

Systems and methods of the present invention can be used to optimize the routing of callers to agents in a contact center. In general, contact routings are optimized by routing contacts such that callers are matched with and connected to particular agents in a manner that increases the chances of an interaction that is deemed beneficial to a contact center (referred to in this application as an "optimal interaction"). Examples of typical optimal interactions include increasing sales, decreasing the duration of the contact (and hence the cost to the contact center), providing for an acceptable level of customer satisfaction, or any other interaction that a contact center may seek to control or optimize. The systems and methods of the present invention can improve the chance of an optimal interaction by, in general, grading agents on an optimal interaction, and matching a graded agent with a caller to increase the chance of the optimal interaction. Once matched, the caller can be connected to the graded agent. In a more advanced embodiment, the systems and methods of the present invention can also be used to increase the chance of an optimal interaction by matching a caller to an agent using a computer model derived from data describing demographic, psychographic, past purchase behavior, or other business-relevant information about a caller, together with data describing demographic, psychographic, or historical performance about an agent.

In a relatively basic embodiment of the present invention, the performance of a contact center's agents is collated over a period time to grade each agent on their ability to achieve an optimal interaction. The period of time can be as short as the immediately prior contact to a period extending as long as the agent's first interaction with a caller. The grade determined for the each agent is then used as a factor in matching and connecting a caller to a particular agent. For example, certain agents may be shown to have a greater ability to generate sales than that of other agents engaged in the same contact center. The present invention, by preferentially routing callers to those agents shown to have greater ability to generate sales, can increase the chances of achieving greater sales during the contacts. Similarly, other agents may be shown to generate shorter interactions with callers than that of other agents at the same contact center. By preferentially routing contacts to the agents shown to generate shorter interactions with callers, a contact center or contact center client can decrease its overall need for agents and communication bandwidth, and therefore, reduce its costs.

In general, by grading the agents at a contact center on their ability to achieve an optimal interaction, the contact center can match and connect callers to agents to increase the chance of achieving any optimal interaction that may be chosen. The method of grading agent can be as simple as ranking each agent on a scale of 1 to N for a particular optimal interaction, with N being the total number of agents. The method of grading can also comprise determining the average contact handle time of each agent to grade the agents on cost, determining the total sales revenue or number of sales generated by each agent to grade the agents on sales, or conducting customer surveys at the end of contacts with callers to grade the agents on customer satisfaction. The foregoing, however, are only examples of how agents may be graded; many other methods exist.

If agents are graded on more than one optimal interaction, the present invention can be configured to weight optimal interactions to ascertain which callers should be routed to which agent. For example, if there were two currently available agents for an individual caller, and the present invention estimated that routing the caller to one agent would result in a higher likelihood of a sale occurring, while routing the caller to the other agent would result in a shorter duration contact, depending on which optimal interaction the present invention was weighting more heavily, the caller may be routed to either the first or the second agent. In another example, if the present invention estimated that routing the caller to one agent would result in a high likelihood of a sale, a short contact duration, but a low level of customer satisfaction, while routing the caller to another agent would result in a high likelihood of a sale, a longer contact duration, but a higher level of customer satisfaction, depending on which mix of optimal interactions the present invention was weighting more heavily, the caller may be routed to the first or second agent.

The weightings placed on the various optimal interactions can take place in realtime in a manner controlled by the contact center, its clients, or in line with predetermined rules. Optionally, the contact center or its clients may control the weighting over the internet or some another data transfer system. As an example, a client of the contact center could access the weightings currently in use over an internet browser and modify these remotely. Such a modification may be set to take immediate effect and, immediately after such a modification, subsequent caller routings occur in line with the newly establishing weightings. An instance of such an example may arise in a case where a contact center client decides that the most important strategic priority in their business at present is the maximization of revenues. In such a case, the client would remotely set the weightings to favor the selection of agents that would generate the greatest probability of a sale in a given contact. Subsequently the client may take the view that maximization of customer satisfaction is more important for their business. In this event, they can remotely set the weightings of the present invention such that callers are routed to agents most likely to maximize their level of satisfaction. Alternatively the change in weighting may be set to take effect at a subsequent time, for instance, commencing the following morning.

With graded agent data and a chosen optimal interaction, the present invention can be used to match a graded agent with a caller to increase the chance of an optimal interaction or a weighted mix of optimal interactions. The matching can occur between a caller and all agents logged in at the contact center, all agents currently available for a contact at the contact center, or any mix or subgroup thereof. The matching rules can be set such that agents with a minimum grade are the only ones suitable for matching with a caller. The matching rules can also be set such that an available agent with the highest grade for an optimal interaction or mix thereof is matched with the caller. To provide for the case in which an agent may have become unavailable in the time elapsed from the time a contact was initiated to the time the switch was directed to connect the caller to a specific agent, instead of directing the switch to connect the caller to a single agent, the matching rules can define an ordering of agent suitability for a particular caller and match the caller to the highest-graded agent in that ordering.

In an outbound contact center environment employing telephone devices, the matching that takes place can be reflected in the form of a lead list. The lead list can be for one particular agent or a group of agents, who can then call through the lead list to conduct their solicitation efforts. Where a dialer is used to call through a lead list, upon obtaining a live caller, the present invention can determine the available agents, match the live caller with one or more of the available agents, and connect the caller with one of those agents. Preferably, the present invention will match the live caller with a group of agents, define an ordering of agent suitability for the caller, match the live caller to the highest-graded agent currently available in that ordering, and connect the caller to the highest-graded agent. In this manner, use of a dialer becomes more efficient in the present invention, as the dialer should be able to continuously call through a lead list and obtain live callers as quickly as possible, which the present invention can then match and connect to the highest graded agent currently available.

In a more advanced embodiment, the system and methods of the present invention can be used to increase the chances of an optimal interaction by combining agent grades, agent demographic data, agent psychographic data, and other business-relevant data about the agent (individually or collectively referred to in this application as "agent data"), along with demographic, psychographic, and other business-relevant data about callers (individually or collectively referred to in this application as "caller data"). Agent and caller demographic data can comprise any of: gender, race, age, education, accent, income, nationality, ethnicity, area code, zip code, marital status, job status, and credit score. Agent and caller psychographic data can comprise any of introversion, sociability, desire for financial success, and film and television preferences.

Caller demographic and psychographic data can be retrieved from available databases by using the caller's contact information as an index. Available databases include, but are not limited to, those that are publicly available, those that are commercially available, or those created by a contact center or a contact center client. In an outbound contact center environment, the caller's contact information is known beforehand. In an inbound contact center environment, the caller's contact information can be retrieved by examining the caller's CallerID information or by requesting this information of the caller at the outset of the contact, such as through entry of a caller account number or other caller-identifying information. Other business-relevant data such as historic purchase behavior, current level of satisfaction as a customer, or volunteered level of interest in a product may also be retrieved from available databases.

Agent demographic and psychographic data can be established by surveying agents at the time of their employment or periodically throughout their employment. Such a survey process can be manual, such as through a paper or oral survey, or automated with the survey being conducted over a computer system, such as by deployment over a web-browser.

Once agent data and caller data have been collected, this data is passed to a computational system. The computational system then, in turn, uses this data in a pattern matching algorithm to create a computer model that matches each agent with each caller and estimates the probable outcome of each matching along a number of optimal interactions, such as the generation of a sale, the duration of contact, or the likelihood of generating an interaction that a customer finds satisfying. As an example, the present invention may indicate that, by matching a caller to a female agent, the matching will increase the probability of a sale by 4 percent, reduce the duration of a contact by 6 percent, and increase the satisfaction of the caller with the interaction by 12 percent. Generally, the present invention will generate more complex predictions spanning multiple demographic and psychographic aspects of agents and callers. The present invention might conclude, for instance, that a caller if connected to a single, white, male, 25 year old, agent that has high speed internet in his home and enjoys comedic films will result in a 12 percent increase in the probability of a sale, a 7 percent decrease in the duration of the contact, and a 2 percent decrease in the caller's satisfaction with the contact. In parallel, the present invention may also determine that the caller if connected to a married, black, female, 55 year old agent will result in a 4 percent increase in the probability of a sale, a 6 percent decrease in the duration of a contact, and a 9 percent increase in the caller's satisfaction with the contact.

Though this advanced embodiment preferably uses agent grades, demographic, psychographic, and other business-relevant data, along with caller demographic, psychographic, and other business-relevant data, other embodiments of the present invention can eliminate one or more types or categories of caller or agent data to minimize the computing power or storage necessary to employ the present invention.

The pattern matching algorithm to be used in the present invention can comprise any correlation algorithm, such as a neural network algorithm or a genetic algorithm. To generally train or otherwise refine the algorithm, actual contact results (as measured for an optimal interaction) are compared against the actual agent and caller data for each contact that occurred. The pattern matching algorithm can then learn, or improve its learning of, how matching certain callers with certain agents will change the chance of an optimal interaction. In this manner, the pattern matching algorithm can then be used to predict the chance of an optimal interaction in the context of matching a caller with a particular set of caller data, with an agent of a particular set of agent data. Preferably, the pattern matching algorithm is periodically refined as more actual data on caller interactions becomes available to it, such as periodically training the algorithm every night after a contact center has finished operating for the day.

The pattern matching algorithm can be used to create a computer model reflecting the predicted chances of an optimal interaction for each agent and caller matching. Preferably, the computer model will comprise the predicted chances for a set of optimal interactions for every agent that is logged in to the contact center as matched against every available caller. Alternatively, the computer model can comprise subsets of these, or sets containing the aforementioned sets. For example, instead of matching every agent logged into the contact center with every available caller, the present invention can match every available agent with every available caller, or even a narrower subset of agents or callers. Likewise, the present invention can match every agent that ever worked on a particular campaign—whether available or logged in or not—with every available caller. Similarly, the computer model can comprise predicted chances for one optimal interaction or a number of optimal interactions.

The computer model can also be further refined to comprise a suitability score for each matching of an agent and a caller. The suitability score can be determined by taking the chances of a set of optimal interactions as predicted by the pattern matching algorithm, and weighting those chances to place more or less emphasis on a particular optimal interaction as related to another optimal interaction. The suitability score can then be used in the present invention to determine which agents should be connected to which callers.

For example, it may be that the computer model indicates that a caller match with agent one will result in a high chance of a sale with but a high chance of a long contact, while a caller match with agent two will result in a low chance of a sale but a high chance of a short contact. If an optimal interaction for a sale is more heavily weighted than an optimal interaction of low cost, then the suitability scores for agent one as compared to agent two will indicate that the caller should be connected to agent one. If, on the other hand, an optimal interaction for a sale is less weighted than an optimal interaction for a low cost contact, the suitability score for agent two as compared to agent one will indicate that the caller should be connected to agent two.

In an outbound contact center environment employing telephone devices, the matching that takes place by using agent and caller data in a pattern matching algorithm can be reflected in the form of a lead list. The lead list can be for one particular agent or a group of agents, who can then call through the lead list to conduct their solicitation efforts. Where a dialer is used to call through a lead list, upon obtaining a live caller, the system can determine the available agents, use caller and agent data with a pattern matching algorithm to match the live caller with one or more of the available agents, and connect the caller with one of those agents. Preferably, the system will match the live caller with a group of agents, define an ordering of agent suitability for the caller within that group, match the live caller to the highest-graded agent that is available in that ordering, and connect the caller to that highest-graded agent. In matching the live caller with a group of agents, the present invention can be used to determine a cluster of agents with similar agent data, such as similar demographic data or psychographic data, and further determine within that cluster an ordering of agent suitability. In this manner, the present invention can increase the efficiency of the dialer and avoid having to stop the dialer until an agent with specific agent data becomes available.

One aspect of the present invention is that it may develop affinity databases by storing data, the databases comprising data on an individual caller's contact outcomes (referred to in this application as "caller affinity data"), independent of their demographic, psychographic, or other business-relevant information. Such caller affinity data can include the caller's purchase history, contact time history, or customer satisfaction history. These histories can be general, such as the caller's general history for purchasing products, average contact time with an agent, or average customer satisfaction ratings. These histories can also be agent specific, such as the caller's purchase, contact time, or customer satisfaction history when connected to a particular agent.

The caller affinity data can then be used to refine the matches that can be made using the present invention. As an example, a certain caller may be identified by their caller affinity data as one highly likely to make a purchase, because in the last several instances in which the caller was contacted, the caller elected to purchase a product or service. This purchase history can then be used to appropriately refine matches such that the caller is preferentially matched with an agent deemed suitable for the caller to increase the chances of an optimal interaction. Using this embodiment, a contact center could preferentially match the caller with an agent who does not have a high grade for generating revenue or who would not otherwise be an acceptable match, because the chance of a sale is still likely given the caller's past purchase behavior. This strategy for matching would leave available other agents who could have otherwise been occupied with a contact interaction with the caller. Alternatively, the contact center may instead seek to guarantee that the caller is matched with an agent with a high grade for generating revenue, irrespective of what the matches generated using caller data and agent demographic or psychographic data may indicate.

A more advanced affinity database developed by the present invention is one in which a caller's contact outcomes are tracked across the various agent data. Such an analysis might indicate, for example, that the caller is most likely to be satisfied with a contact if they are matched to an agent of similar gender, race, age, or even with a specific agent. Using this embodiment, the present invention could preferentially match a caller with a specific agent or type of agent that is known from the caller affinity data to have generated an acceptable optimal interaction.

Affinity databases can provide particularly actionable information about a caller when commercial, client, or publicly-available database sources may lack information about the caller. This database development can also be used to further enhance contact routing and agent-to-caller matching even in the event that there is available data on the caller, as it may drive the conclusion that the individual caller's contact outcomes may vary from what the commercial databases might imply. As an example, if the present invention was to rely solely on commercial databases in order to match a caller and agent, it may predict that the caller would be best matched to an agent of the same gender to achieve optimal customer satisfaction. However, by including affinity database information developed from prior interactions with the caller, the present invention might more accurately predict that the caller would be best matched to an agent of the opposite gender to achieve optimal customer satisfaction.

Another aspect of the present invention is that it may develop affinity databases that comprise revenue generation, cost, and customer satisfaction performance data of individual agents as matched with specific caller demographic, psychographic, or other business-relevant characteristics (referred to in this application as "agent affinity data"). An affinity database such as this may, for example, result in the present invention predicting that a specific agent performs best in interactions with callers of a similar age, and less well in interactions with a caller of a significantly older or younger age. Similarly this type of affinity database may result in the present invention predicting that an agent with certain agent affinity data handles callers originating from a particular geography much better than the agent handles callers from other geographies. As another example, the present invention may predict that a particular agent performs well in circumstances in which that agent is connected to an irate caller.

Though affinity databases are preferably used in combination with agent data and caller data that pass through a pattern matching algorithm to generate matches, information stored in affinity databases can also be used independently of agent data and caller data such that the affinity information is the only information used to generate matches.

The present invention can also comprise connection rules to define when or how to connect agents that are matched to a caller. The connection rules can be as simple as instructing the present invention to connect a caller according to the best match among all available agents with that particular caller. In this manner, caller hold time can be minimized. The connection rules can also be more involved, such as instructing the present invention to connect a caller only when a minimum threshold match exists between an available agent and a caller, or to allow a defined period of time to search for a minimum matching or the best available matching at that time. The connection rules can also purposefully keep certain agents available while a search takes place for a potentially better match.

It is typical for a queue of callers on hold to form at a contact center. When a queue has formed it is desirable to minimize the hold time of each caller in order to increase the chances of obtaining customer satisfaction and decreasing the cost of the contact, which cost can be, not only a function of the contact duration, but also a function of the chance that a caller will drop the contact if the wait is too long. After matching the caller with agents, the connection rules can thus be configured to comprise an algorithm for queue jumping, whereby a favorable match of a caller on hold and an available agent will result in that caller "jumping" the queue by increasing the caller's connection priority so that the caller is passed to that agent first ahead of others in the chronologically listed queue. The queue jumping algorithm can be further configured to automatically implement a trade-off between the cost associated with keeping callers on hold against the benefit in terms of the chance of an optimal interaction taking place if the caller is jumped up the queue, and jumping callers up the queue to increase the overall chance of an optimal interaction taking place over time at an acceptable or minimum level of cost or chance of customer satisfaction. Callers can also be jumped up a queue if an affinity database indicates that an optimal interaction is particularly likely if the caller is matched with a specific agent that is already available.

Ideally, the connection rules should be configured to avoid situations where matches between a caller in a queue and all logged-in agents are likely to result in a small chance of a sale, but the cost of the contact is long and the chances of customer satisfaction slim because the caller is kept on hold for a long time while the present invention waits for the most optimal agent to become available. By identifying such a caller and jumping the caller up the queue, the contact center can avoid the situation where the overall chances of an optimal interaction (e.g., a sale) are small, but the monetary and satisfaction cost of the contact is high.

One embodiment of the present invention comprises the injection of a degree of randomness into the contact routing process such that the specific agent identified by the present invention as optimal or the ordering of agents produced is randomly overridden, and the caller is connected to an agent not necessarily identified as optimal for the caller. Such an injection of partial randomness may be useful in the case where the present invention would like certain agents to be connected to callers that they would not normally be likely to be connected to under the normal functioning in order for the agents to potentially learn from such interactions and improve their abilities in handling such callers. The degree of randomness can be set to 0.1 percent, in which case essentially no randomness is injected into the contact routing process, to 99.9 percent in which case the present invention is essentially not functioning at all, to 50 percent in which case half of all callers are routed randomly to agents, or any other value between 0.1 percent and 99.9 percent. Optionally, this degree of randomness can be set by the contact center, an agent, or by the contact center's clients. Such a setting may be done remotely over a data transfer and retrieval system like the internet, and can be configured to take immediate effect or may be set to take effect at a subsequent time.

The present invention may store data specific to each routed caller for subsequent analysis. For example, the present invention can store data generated in any computer model, including the chances for an optimal interaction as predicted by the computer model, such as the chances of sales, contact durations, customer satisfaction, or other parameters. Such a store may include actual data for the caller connection that was made, including the agent and caller data, whether a sale occurred, the duration of the contact, and the level of customer satisfaction. Such a store may also include actual data for the agent to caller matches that were made, as well as how, which, and when matches were considered pursuant to connection rules and prior to connection to a particular agent.

This stored information may be analyzed in several ways. One possible way is to analyze the cumulative effect of the present invention on an optimal interaction over different intervals of time and report that effect to the contact center or the contact center client. For example, the present invention can report back as to the cumulative impact of the present invention in enhancing revenues, reducing costs, increasing customer satisfaction, over five minute, one hour, one month, one year, and other time intervals, such as since the beginning of a particular client solicitation campaign. Similarly, the present invention can analyze the cumulative effect of the present invention in enhancing revenue, reducing costs, and increasing satisfaction over a specified number of callers, for instance 10 callers, 100 callers, 1000 callers, the total number of callers processed, or other total numbers of callers.

One method for reporting the cumulative effect of employing the present invention comprises matching a caller with each agent logged in at the contact center, averaging the chances of an optimal interaction over each agent, determining which agent was connected to the caller, dividing the chance of an optimal interaction for the connected agent by the average chance, and generating a report of the result. In this manner, the effect of the present invention can be reported as the predicted increase associated with routing a caller to a specific agent as opposed to randomly routing the caller to any logged-in agent. This reporting method can also be modified to compare the optimal interaction chance of a specific agent routing against the chances of an optimal interaction as averaged over all available agents or over all logged-in agents since the commencement of a particular campaign. In fact, by dividing the average chance of an optimal interaction over all unavailable agents at a specific period of time by the average chance of an optimal interaction over all available agents at that same time, a report can be generated that indicates the overall boost created by the present invention to the chance of an optimal interaction at that time. Alternatively, the present invention can be monitored, and reports generated, by cycling the present invention on and off for a single agent or group of agents over a period of time, and measuring the actual contact results. In this manner, it can be determined what the actual, measured benefits are created by employing the present invention.

Embodiments of the present invention can include a visual computer interface and printable reports provided to the contact center or their clients to allow them to, in a realtime or a past performance basis, monitor the statistics of agent to caller matches, measure the optimal interactions that are being achieved versus the interactions predicted by the computer model, as well as any other measurements of real time or past performance using the methods described herein. A visual computer interface for changing the weighting on an optimal interaction can also be provided to the contact center or the contact center client, such that they can, as discussed herein, monitor or change the weightings in real time or at a predetermined time in the future.

Embodiments of the present invention can be used to create an intelligent routing system, the system comprising means for grading two or more agents on an optimal interaction, and means for matching a caller with at least one of the two or more graded agents to increase the chance of the optimal interaction. Means for grading an agent can comprise, as discussed herein, the use of manual or automatic surveys, the use of a computational device and database to record an agent's revenue generation performance per call, the agent's contact time per caller, or any other performance criteria that can be electronically recorded. Means for matching the caller with at least one of the two or more graded agents can comprise any computational device. The intelligent routing system can further comprise means for connecting the caller with one of the two or more agents, such as a switching system. The system can further comprise a dialer, a callerID device, and other commercially-available telephony or telecommunications equipment, as well as memory containing a database, such as a commercially available database, publicly-available database, client database, or contact center database.

In a more advanced embodiment, the present invention can be used to create an intelligent routing system, the system comprising means for determining at least one agent data for each of two or more agents, determining at least one caller data for a caller, means for using the agent data and the caller data in a pattern matching algorithm, and means for matching the caller to one of the two or more agents to increase the chance of an optimal interaction. Means for determining agent data can comprise the use of manual or automatic surveys, which can be recorded in hardcopy or electronic form, such as through the use of computer memory containing databases for storing such information. Means for determining caller data can comprise the use of computer memory containing a database with caller data, such as a commercially-available database, client database, or contact center database. Means for determining caller data can also comprise the use of a CallerID device as well as telephony or other telecommunications equipment for receiving a caller's account number or other caller-identifying information. Means for using the agent data and the caller data in a pattern matching algorithm can comprise a computational device. Means for matching the caller to one of the two or more agents can also comprise the use of a computational device. This embodiment of the intelligent routing system can also comprise means for connecting the caller with one of the two or more agents, such as a switching or routing system. The system can also comprise means for contacting a caller, such as a dialer or telephony equipment that can be used by an agent to contact the caller.

Embodiments of the present invention can further include a method of identifying an agent pool to increase the chances of an optimal interaction for the contact center generally, or for specific contact center clients. By identifying an agent pool with this method, the contact center can configure an agent pool that increases the contact center's overall chances for obtaining a sale, operating at low cost, obtaining an acceptable level of customer satisfaction, or some other optimal interaction. The agent pool can also be identified and configured to increase these overall chances of a chosen optimal interaction for a specific contact center client or group of clients.

The method of identifying an ideal agent pool can comprise determining an optimal interaction, determining a set of caller data for a sample of callers, determining a set of agent data, generating a computer model for the optimal interaction with the set of caller data and the set of agent data, and identifying agent data that increases the overall chances of the optimal interaction. The step of determining a set of caller data can comprise determining the set from actual caller data, predicted or theoretical caller data, or a mixture thereof. The step of determining a set of agent data can comprise determining the set from actual agent data, predicted or theoretical agent data, or a mixture thereof. By passing this data through a pattern matching algorithm, a computer model can be generated reflecting the predicted chances of an optimal interaction occurring when callers with the set of caller data are matched with agents with the agent data. The computer model can then be parsed to determine what agent data is most effective for an optimal interaction.

For example, it may be that, for a certain sample of callers, Latino females between the ages of 21 and 25 with an interest in television shows are better at generating revenue with those callers than agents of other agent data. By using the present invention, a contact center can identify that agents with such agent data are ideal for maximizing the chances of an optimal interaction for certain callers. The contact center can then configure its operations to have an ideal agent pool, either for a particular client, a group of clients, or for the contact center in general. The ideal agent pool can be configured by grouping agents that the contact center has already acquired, by determining what types of agents the contact center should hire, or a mixture thereof. This embodiment can thus be particularly useful in identifying what agents to hire, transfer, or terminate.

Many of the techniques described here may be implemented in hardware or software, or a combination of the two. Preferably, the techniques are implemented in computer programs executing on programmable computers that each includes a processor, a storage medium readable by the processor (including volatile and nonvolatile memory and/or storage elements), and suitable input and output devices. Program code is applied to data entered using an input device to perform the functions described and to generate output information. The output information is applied to one or more output devices. Moreover, each program is preferably implemented in a high level procedural or object-oriented programming language to communicate with a computer system. However, the programs can be implemented in assembly or machine language, if desired, In any case, the language may be a compiled or interpreted language.

Each such computer program is preferably stored on a storage medium or device (e.g., CD-ROM, hard disk or magnetic diskette) that is readable by a general or special purpose programmable computer for configuring and operating the computer when the storage medium or device is read by the computer to perform the procedures described. The system also may be implemented as a computer-readable storage medium, configured with a computer program, where the storage medium so configured causes a computer to operate in a specific and predefined manner.

DESCRIPTION

Figure 1:
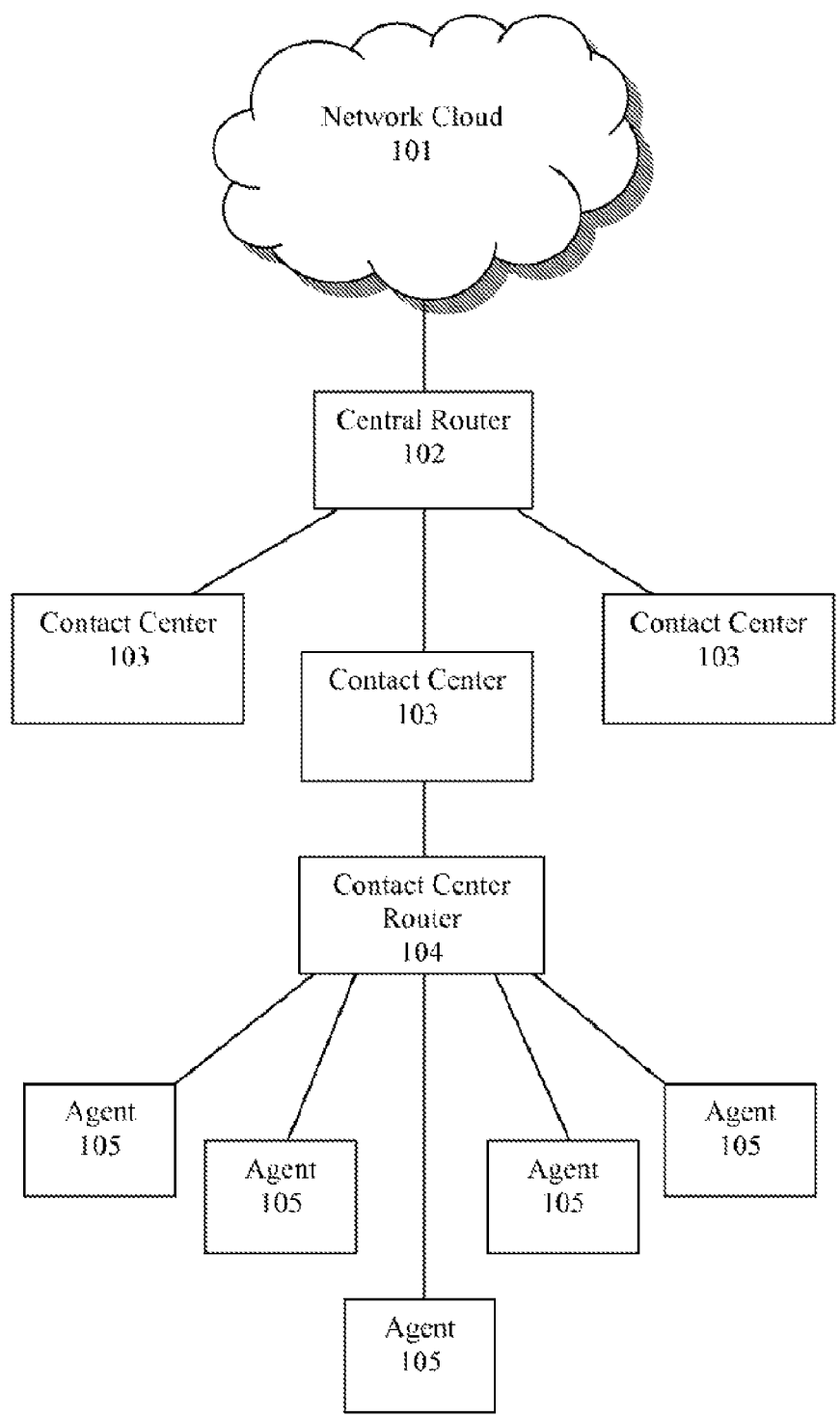
FIG. 1 is a diagram reflecting the general setup of a contact center operation.

FIG. 1 is a diagram reflecting the general setup of a contact center operation 100. The network cloud 101 reflects a specific or regional telecommunications network designed to receive incoming callers or to support contacts made to outgoing callers. The network cloud 101 can comprise a single contact address, such as a telephone number or email address, or multiple contract addresses. The central router 102 reflects contact routing hardware and software designed to help route contacts among call centers 103. The central router 102 may not be needed where there is only a single contact center deployed. Where multiple contact centers are deployed, more routers may be needed to route contacts to another router for a specific contact center 103. At the contact center level 103, a contact center router 104 will route a contact to an agent 105 with an individual telephone or other telecommunications equipment 105. Typically, there are multiple agents 105 at a contact center 103, though there are certainly embodiments where only one agent 105 is at the contact center 103, in which case a contact center router 104 may prove to be unnecessary.

Figure 2:
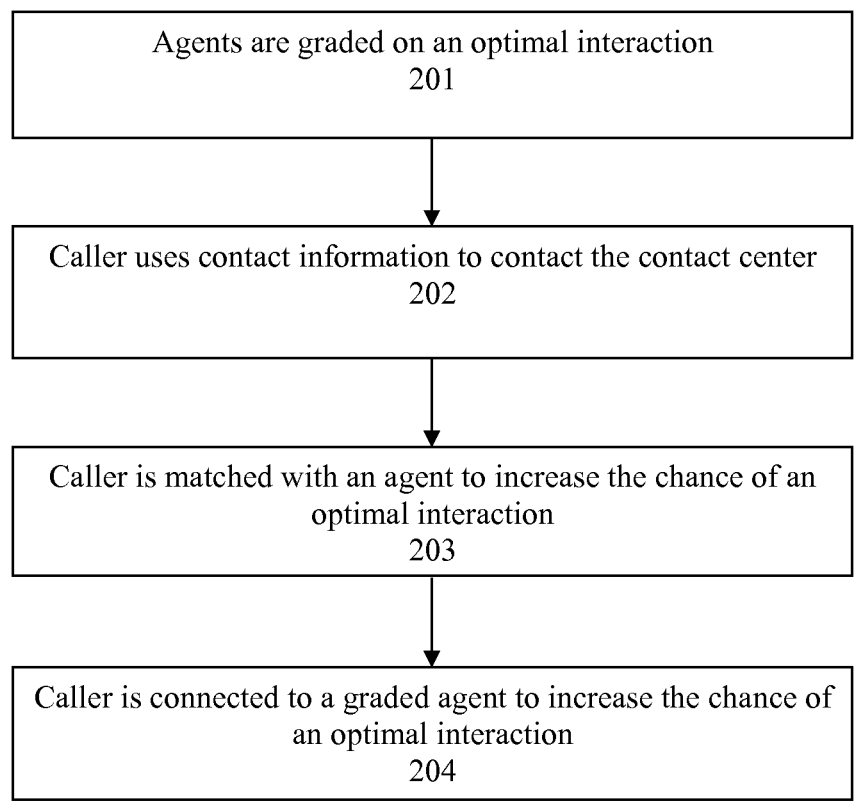
FIG. 2 is a flowchart reflecting one embodiment of the invention involving a method for the operating an inbound contact center.

FIG. 2 is a flowchart of one embodiment of the invention involving a method for the operating an inbound contact center, the method comprising grading two agents on an optimal interaction and matching a caller with at least one of the two graded agents to increase the chance of the optimal interaction. In the initial step 201, agents are graded on an optimal interaction, such as increasing revenue, decreasing costs, or increasing customer satisfaction. Grading is accomplished by collating the performance of a contact center agent over a period of time on their ability to achieve an optimal interaction, such as a period of at least 10 days. However, the period of time can be as short as the immediately prior contact to a period extending as long as the agent's first interaction with a caller. Moreover, the method of grading agent can be as simple as ranking each agent on a scale of 1 to N for a particular optimal interaction, with N being the total number of agents. The method of grading can also comprise determining the average contact handle time of each agent to grade the agents on cost, determining the total sales revenue or number of sales generated by each agent to grade the agents on sales, or conducting customer surveys at the end of contacts with callers to grade the agents on customer satisfaction. The foregoing, however, are only examples of how agents may be graded; many other methods exist.

In step 202 a caller uses contact information, such as a telephone number or email address, to initiate a contact with the contact center. In step 203, the caller is matched with an agent or group of agents such that the chance of an optimal interaction is increased, as opposed to just using the round robin matching methods of the prior art. The matching can occur between a caller and all agents logged in at the contact center, all agents currently available for a contact at the contact center, or any mix or subgroup thereof. The matching rules can be set such that agents with a minimum grade are the only ones suitable for matching with a caller. The matching rules can also be set such that an available agent with the highest grade for an optimal interaction or mix thereof is matched with the caller. To provide for the case in which an agent may have become unavailable in the time elapsed from the time a contact was initiated to the time the switch was directed to connect the caller to a specific agent, instead of directing the switch to connect the caller to a single agent, the matching rules can define an ordering of agent suitability for a particular caller and match the caller to the highest-graded agent in that ordering. In step 204, the caller is then connected to a graded agent to increase the chance of an optimal interaction, and the contact interaction between the agent and the caller then occurs.

Figure 3:
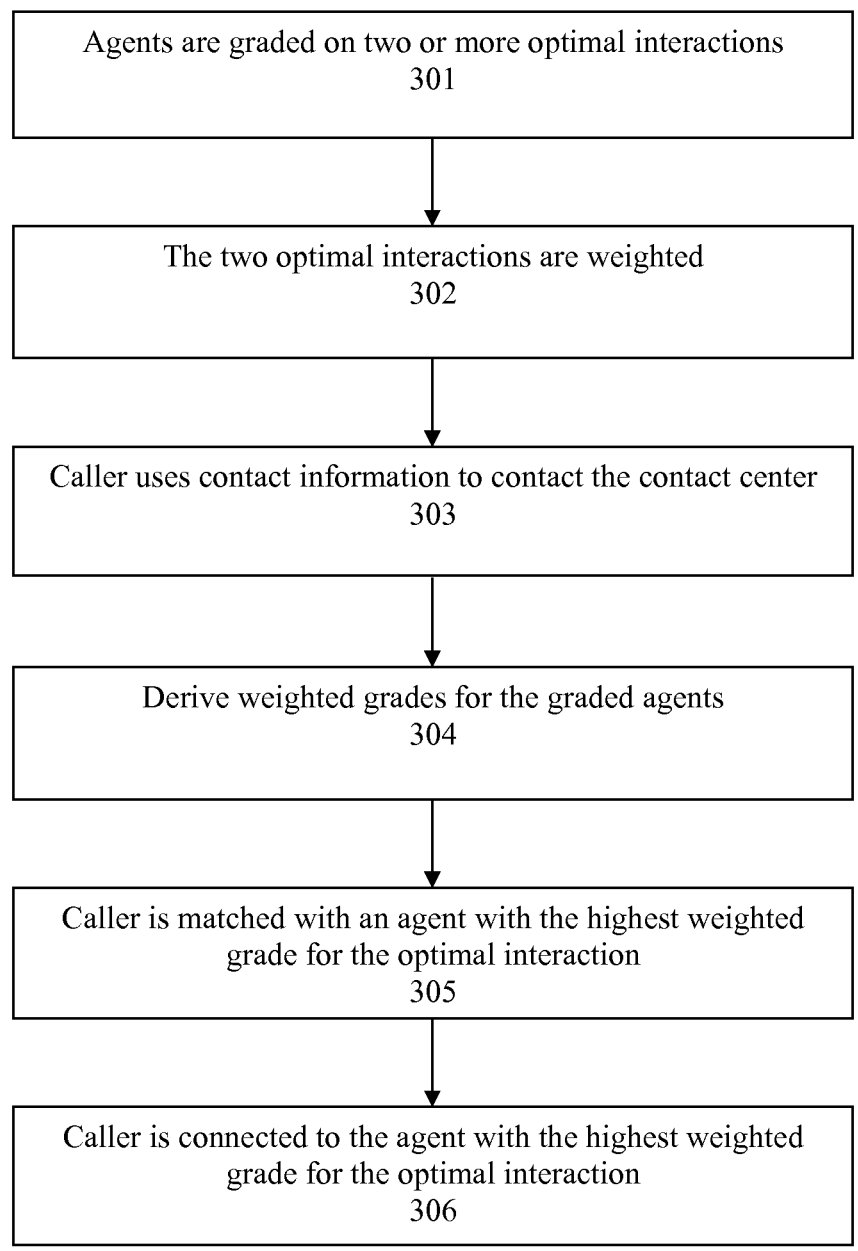
FIG. 3 is a flowchart reflecting one embodiment of the invention involving a method for the operating an inbound contact center with weighted optimal interactions.

FIG. 3 is a flowchart of one embodiment of the invention involving a method for the operating an inbound contact center, the method comprising grading a group of at least agents on two optimal interactions, weighting one optimal interaction against another optional interaction, and connecting the caller with one of the two graded agents to increase the chance of a more heavily-weighted optimal interaction. In step 301, agents are graded on two or more optimal interactions, such as increasing revenue, decreasing costs, or increasing customer satisfaction. In step 302, the optimal interactions are weighted against each other. The weighting can be as simple as assigning to each optimal interaction a percentage weight factor, with all such factors totaling to 100 percent. Any comparative weighting method can be used, however. The weightings placed on the various optimal interactions can take place in real-time in a manner controlled by the contact center, its clients, or in line with pre-determined rules. Optionally, the contact center or its clients may control the weighting over the internet or some another data transfer system. As an example, a client of the contact center could access the weightings currently in use over an internet browser and modify these remotely. Such a modification may be set to take immediate effect and, immediately after such a modification, subsequent caller routings occur in line with the newly establishing weightings. An instance of such an example may arise in a case where a contact center client decides that the most important strategic priority in their business at present is the maximization of revenues. In such a case, the client would remotely set the weightings to favor the selection of agents that would generate the greatest probability of a sale in a given contact. Subsequently the client may take the view that maximization of customer satisfaction is more important for their business. In this event, they can remotely set the weightings of the present invention such that callers are routed to agents most likely to maximize their level of satisfaction. Alternatively the change in weighting may be set to take effect at a subsequent time, for instance, commencing the following morning.

In step 303, a caller uses contact information, such as a telephone number or email address, to initiate a contact with the contact center. In step 304, the optimal interaction grades for the graded agents are used with the weights placed on those optimal interactions to derive weighted grades for those graded agents. In step 305, the caller is matched with an available agent with the highest weighted grade for the optimal interaction. In step 306, the caller is then connected to the agent with the highest weighted grade to increase the chance of the more-heavily weighted optimal interaction. This embodiment can also be modified such that the caller is connected to the agent with the highest-weighted mix of grades to increase the chance of the more-heavily weighted mix of optimal interactions. It will be appreciated that the steps outlined in the flowchart of FIG. 3 need not occur in that exact order.

Figure 4:
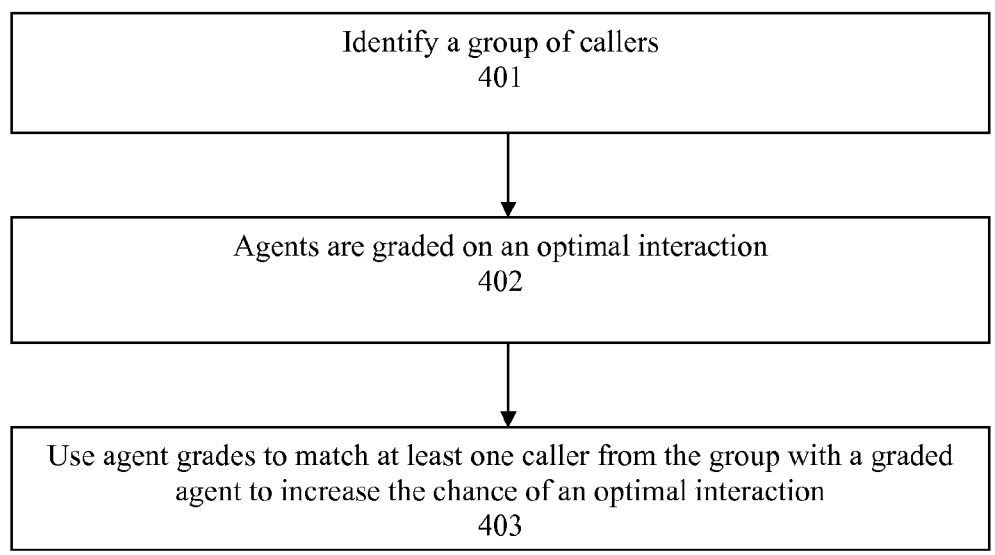
FIG. 4 is a flowchart reflecting one embodiment of the invention reflecting a method of operating an outbound contact center.

FIG. 4 is a flowchart of one embodiment of the invention reflecting a method of operating an outbound contact center, the method comprising, identifying a group of at least two callers, grading two agents on an optimal interaction; and matching at least one of the two graded agents with at least one caller from the group. In step 401, a group of at least two callers is identified. This is typically accomplished through the use of lead list that is provided to the contact center by the contact center's client. In step 402, a group of at least two agents are graded on an optimal interaction. In step 403, the agent grades are used to match one or more of the callers from the group with one or more of the graded agents to increase the chance of an optimal interaction. This matching can be embodied in the form of separate lead lists generated for one or more agents, which the agents can then use to conduct their solicitation efforts.

In an outbound contact center employing telephone devices, it is more common to have a dialer call through a lead list. Upon a dialer obtaining a live caller, the present invention can determine the available agents and their respective grades for the optimal interaction, match the live caller with one or more of the available agents to increase the chance of an optimal interaction, and connect the caller with one of those agents who can then conduct their solicitation effort. Preferably, the present invention will match the live caller with a group of agents, define an ordering of agent suitability for the caller, match the live caller to the highest-graded agent currently available in that ordering, and connect the caller to the highest-graded agent. In this manner, use of a dialer becomes more efficient in the present invention, as the dialer should be able to continuously call through a lead list and obtain live callers as quickly as possible, which the present invention can then match and connect to the highest graded agent currently available. It will be appreciated that the steps outlined in the flowchart of FIG. 4 need not occur in that exact order.

Figure 5:
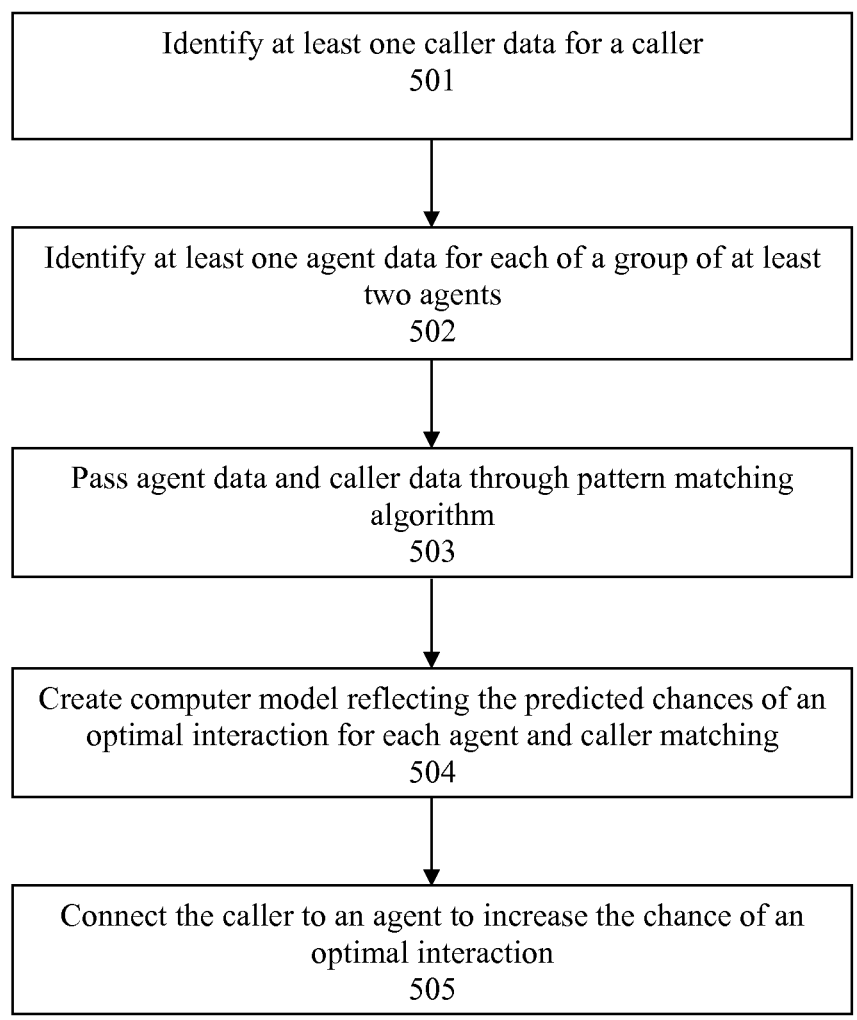
FIG. 5 is a flowchart reflecting a more advanced embodiment of the present invention using agent data and caller data in an inbound contact center.

FIG. 5 is a flowchart reflecting a more advanced embodiment of the present invention that can be used to increase the chances of an optimal interaction by combining agent grades, agent demographic data, agent psychographic data, and other business-relevant data about the agent (individually or collectively referred to in this application as "agent data"), along with demographic, psychographic, and other business-relevant data about callers (individually or collectively referred to in this application as "caller data"). Agent and caller demographic data can comprise any of: gender, race, age, education, accent, income, nationality, ethnicity, area code, zip code, marital status, job status, and credit score. Agent and caller psychographic data can comprise any of introversion, sociability, desire for financial success, and film and television preferences. It will be appreciated that the steps outlined in the flowchart of FIG. 5 need not occur in that exact order.

Accordingly, an embodiment of a method for operating an inbound contact center comprises determining at least one caller data for a caller, determining at least one agent data for each of two agents, using the agent data and the caller data in a pattern matching algorithm, and matching the caller to one of the two agents to increase the chance of an optimal interaction. In step 501, at least one caller data (such as a caller demographic or psychographic data) is determined. One way of accomplishing this is by retrieving this from available databases by using the caller's contact information as an index. Available databases include, but are not limited to, those that are publicly available, those that are commercially available, or those created by a contact center or a contact center client. In an outbound contact center environment, the caller's contact information is known beforehand. In an inbound contact center environment, the caller's contact information can be retrieved by examining the caller's CallerID information or by requesting this information of the caller at the outset of the contact, such as through entry of a caller account number or other caller-identifying information. Other business-relevant data such as historic purchase behavior, current level of satisfaction as a customer, or volunteered level of interest in a product may also be retrieved from available databases.

In step 502, at least one agent data for each of two agents is determined. One method of determining agent demographic or psychographic data can involve surveying agents at the time of their employment or periodically throughout their employment. Such a survey process can be manual, such as through a paper or oral survey, or automated with the survey being conducted over a computer system, such as by deployment over a web-browser.

Though this advanced embodiment preferably uses agent grades, demographic, psychographic, and other business-relevant data, along with caller demographic, psychographic, and other business-relevant data, other embodiments of the present invention can eliminate one or more types or categories of caller or agent data to minimize the computing power or storage necessary to employ the present invention.

Once agent data and caller data have been collected, this data is passed to a computational system. The computational system then, in turn, uses this data in a pattern matching algorithm in step 503 to create a computer model that matches each agent with the caller and estimates the probable outcome of each matching along a number of optimal interactions, such as the generation of a sale, the duration of contact, or the likelihood of generating an interaction that a customer finds satisfying.

The pattern matching algorithm to be used in the present invention can comprise any correlation algorithm, such as a neural network algorithm or a genetic algorithm. To generally train or otherwise refine the algorithm, actual contact results (as measured for an optimal interaction) are compared against the actual agent and caller data for each contact that occurred. The pattern matching algorithm can then learn, or improve its learning of, how matching certain callers with certain agents will change the chance of an optimal interaction. In this manner, the pattern matching algorithm can then be used to predict the chance of an optimal interaction in the context of matching a caller with a particular set of caller data, with an agent of a particular set of agent data. Preferably, the pattern matching algorithm is periodically refined as more actual data on caller interactions becomes available to it, such as periodically training the algorithm every night after a contact center has finished operating for the day.

In step 504, the pattern matching algorithm is used to create a computer model reflecting the predicted chances of an optimal interaction for each agent and caller matching. Preferably, the computer model will comprise the predicted chances for a set of optimal interactions for every agent that is logged in to the contact center as matched against every available caller. Alternatively, the computer model can comprise subsets of these, or sets containing the aforementioned sets. For example, instead of matching every agent logged into the contact center with every available caller, the present invention can match every available agent with every available caller, or even a narrower subset of agents or callers. Likewise, the present invention can match every agent that ever worked on a particular campaign—whether available or logged in or not—with every available caller. Similarly, the computer model can comprise predicted chances for one optimal interaction or a number of optimal interactions.

The computer model can also be further refined to comprise a suitability score for each matching of an agent and a caller. The suitability score can be determined by taking the chances of a set of optimal interactions as predicted by the pattern matching algorithm, and weighting those chances to place more or less emphasis on a particular optimal interaction as related to another optimal interaction. The suitability score can then be used in the present invention to determine which agents should be connected to which callers.

In step 505, connection rules are applied to define when or how to connect agents that are matched to a caller, and the caller is accordingly connected with an agent. The connection rules can be as simple as instructing the present invention to connect a caller according to the best match among all available agents with that particular caller. In this manner, caller hold time can be minimized. The connection rules can also be more involved, such as instructing the present invention to connect a caller only when a minimum threshold match exists between an available agent and a caller, to allow a defined period of time to search for a minimum matching or the best available matching at that time, or to define an order of agent suitability for a particular caller and connect the caller with a currently available agent in that order with the best chances of achieving an optimal interaction. The connection rules can also purposefully keep certain agents available while a search takes place for a potentially better match.

It is typical for a queue of callers on hold to form at a contact center. When a queue has formed it is desirable to minimize the hold time of each caller in order to increase the chances of obtaining customer satisfaction and decreasing the cost of the contact, which cost can be, not only a function of the contact duration, but also a function of the chance that a caller will drop the contact if the wait is too long. After matching the caller with agents, the connection rules can thus be configured to comprise an algorithm for queue jumping, whereby a favorable match of a caller on hold and an available agent will result in that caller "jumping" the queue by increasing the caller's connection priority so that the caller is passed to that agent first ahead of others in the chronologically listed queue. The queue jumping algorithm can be further configured to automatically implement a trade-off between the cost associated with keeping callers on hold against the benefit in terms of the chance of an optimal interaction taking place if the caller is jumped up the queue, and jumping callers up the queue to increase the overall chance of an optimal interaction taking place over time at an acceptable or minimum level of cost or chance of customer satisfaction. Callers can also be jumped up a queue if an affinity database indicates that an optimal interaction is particularly likely if the caller is matched with a specific agent that is already available.

Ideally, the connection rules should be configured to avoid situations where matches between a caller in a queue and all logged-in agents are likely to result in a small chance of a sale, but the cost of the contact is long and the chances of customer satisfaction slim because the caller is kept on hold for a long time while the present invention waits for the most optimal agent to become available. By identifying such a caller and jumping the caller up the queue, the contact center can avoid the situation where the overall chances of an optimal interaction (e.g., a sale) are small, but the monetary and satisfaction cost of the contact is high.

An embodiment of the present invention can also comprise the injection of a degree of randomness into the contact routing process such that the specific agent identified by the present invention as optimal or the ordering of agents produced is randomly overridden, and the caller is connected to an agent not necessarily identified as optimal for the caller. Such an injection of partial randomness may be useful in the case where the present invention would like certain agents to be connected to callers that they would not normally be likely to be connected to under the normal functioning in order for the agents to potentially learn from such interactions and improve their abilities in handling such callers. The degree of randomness can be set to 0.1 percent, in which case essentially no randomness is injected into the contact routing process, to 99.9 percent in which case the present invention is essentially not functioning at all, to 50 percent in which case half of all callers are routed randomly to agents, or any other value between 0.1 percent and 99.9 percent. Optionally, this degree of randomness can be set by the contact center, an agent, or by the contact center's clients. Such a setting may be done remotely over a data transfer and retrieval system like the internet, and can be configured to take immediate effect or may be set to take effect at a subsequent time.

Embodiments of the present invention can also comprise affinity databases, the databases comprising data on an individual caller's contact outcomes (referred to in this application as "caller affinity data"), independent of their demographic, psychographic, or other business-relevant information. Such caller affinity data can include the caller's purchase history, contact time history, or customer satisfaction history. These histories can be general, such as the caller's general history for purchasing products, average contact time with an agent, or average customer satisfaction ratings. These histories can also be agent specific, such as the caller's purchase, contact time, or customer satisfaction history when connected to a particular agent.

The caller affinity data can then be used to refine the matches that can be made using the present invention. As an example, a certain caller may be identified by their caller affinity data as one highly likely to make a purchase, because in the last several instances in which the caller was contacted, the caller elected to purchase a product or service. This purchase history can then be used to appropriately refine matches such that the caller is preferentially matched with an agent deemed suitable for the caller to increase the chances of an optimal interaction. Using this embodiment, a contact center could preferentially match the caller with an agent who does not have a high grade for generating revenue or who would not otherwise be an acceptable match, because the chance of a sale is still likely given the caller's past purchase behavior. This strategy for matching would leave available other agents who could have otherwise been occupied with a contact interaction with the caller. Alternatively, the contact center may instead seek to guarantee that the caller is matched with an agent with a high grade for generating revenue, irrespective of what the matches generated using caller data and agent demographic or psychographic data may indicate.

A more advanced affinity database developed by the present invention is one in which a caller's contact outcomes are tracked across the various agent data. Such an analysis might indicate, for example, that the caller is most likely to be satisfied with a contact if they are matched to an agent of similar gender, race, age, or even with a specific agent. Using this embodiment, the present invention could preferentially match a caller with a specific agent or type of agent that is known from the caller affinity data to have generated an acceptable optimal interaction.

Affinity databases can provide particularly actionable information about a caller when commercial, client, or publicly-available database sources may lack information about the caller. This database development can also be used to further enhance contact routing and agent-to-caller matching even in the event that there is available data on the caller, as it may drive the conclusion that the individual caller's contact outcomes may vary from what the commercial databases might imply. As an example, if the present invention was to rely solely on commercial databases in order to match a caller and agent, it may predict that the caller would be best matched to an agent of the same gender to achieve optimal customer satisfaction. However, by including affinity database information developed from prior interactions with the caller, the present invention might more accurately predict that the caller would be best matched to an agent of the opposite gender to achieve optimal customer satisfaction.

Another aspect of the present invention is that it may develop affinity databases that comprise revenue generation, cost, and customer satisfaction performance data of individual agents as matched with specific caller demographic, psychographic, or other business-relevant characteristics (referred to in this application as "agent affinity data"). An affinity database such as this may, for example, result in the present invention predicting that a specific agent performs best in interactions with callers of a similar age, and less well in interactions with a caller of a significantly older or younger age. Similarly this type of affinity database may result in the present invention predicting that an agent with certain agent affinity data handles callers originating from a particular geography much better than the agent handles callers from other geographies. As another example, the present invention may predict that a particular agent performs well in circumstances in which that agent is connected to an irate caller.

Though affinity databases are preferably used in combination with agent data and caller data that pass through a pattern matching algorithm to generate matches, information stored in affinity databases can also be used independently of agent data and caller data such that the affinity information is the only information used to generate matches.

Figure 6:
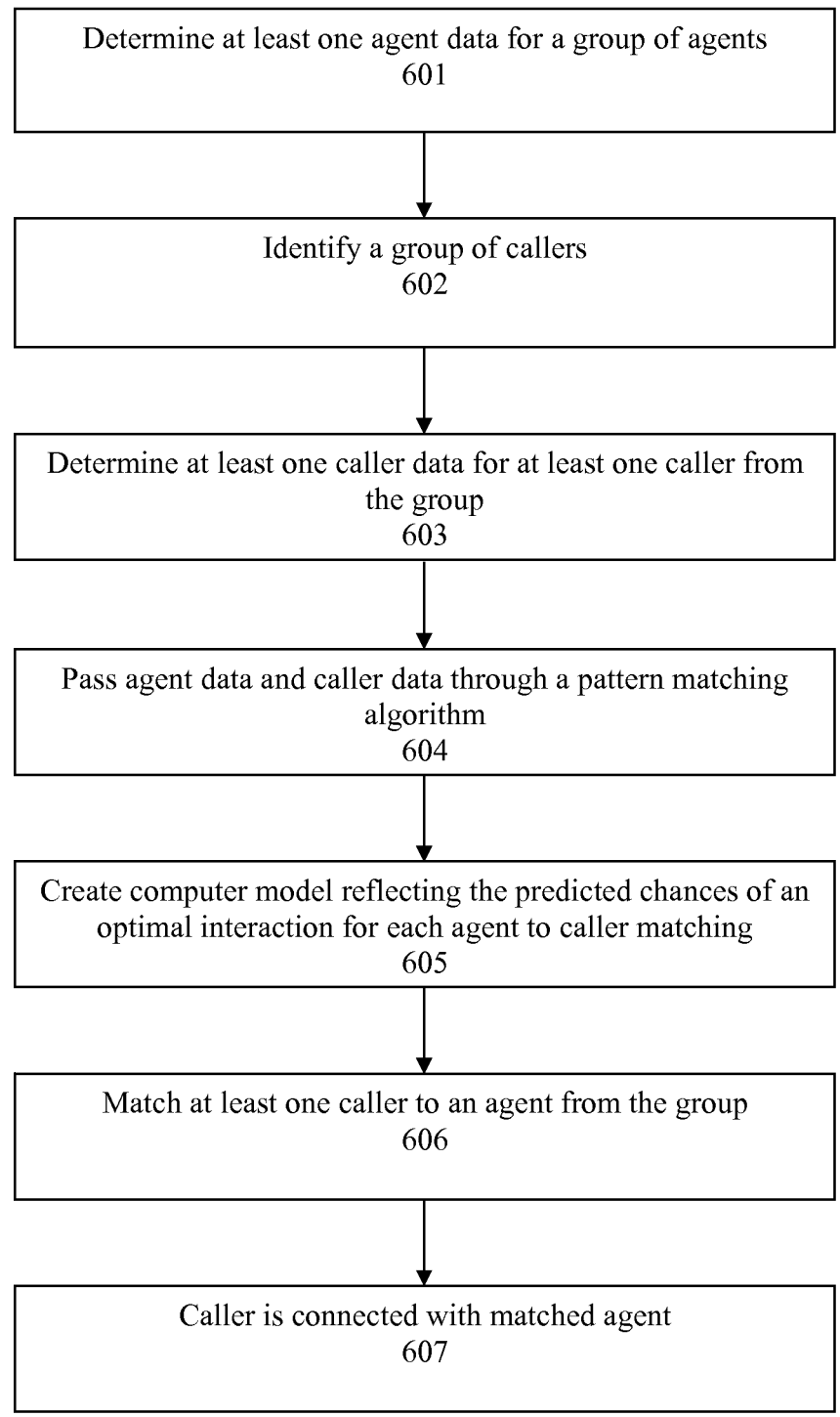
FIG. 6 is a flowchart reflecting a more advanced embodiment of the present invention using agent data and caller data in an outbound contact center.

FIG. 6 reflects a method for operating an outbound contact center, the method comprising, determining at least one agent data for each of two agents, identifying a group of at least two callers, determining at least one caller data for at least one caller from the group, using the agent data and the caller data in a pattern matching algorithm; and matching at least one caller from the group to one of the two agents to increase the chance of an optimal interaction. In step 601, at least one agent data is determined for a group of at least two agents. In step 602, a group at least two callers is identified. This is typically accomplished through the use of lead list that is provided to the contact center by the contact center's client. In step 603, at least one caller data for at least one caller from the group is identified.

Once agent data and caller data have been collected, this data is passed to a computational system. The computational system then, in turn, uses this data in a pattern matching algorithm in step 604 to create a computer model that matches each agent with a caller from the group and estimates the probable outcome of each matching along a number of optimal interactions, such as the generation of a sale, the duration of contact, or the likelihood of generating an interaction that a customer finds satisfying. In step 605, the pattern matching algorithm is used to create a computer model reflecting the predicted chances of an optimal interaction for each agent and caller matching.

In step 606, callers are matched with an agent or a group of agents. This matching can be embodied in the form of separate lead lists generated for one or more agents, which the agents can then use to conduct their solicitation efforts. In step 607, the caller is connected to the agent and the agent conducts their solicitation effort. It will be appreciated that the steps outlined in the flowchart of FIG. 6 need not occur in that exact order.

Where a dialer is used to call through a lead list, upon obtaining a live caller, the system can determine the available agents, use caller and agent data with a pattern matching algorithm to match the live caller with one or more of the available agents, and connect the caller with one of those agents. Preferably, the system will match the live caller with a group of agents, define an ordering of agent suitability for the caller within that group, match the live caller to the highest-graded agent that is available in that ordering, and connect the caller to that highest-graded agent. In matching the live caller with a group of agents, the present invention can be used to determine a cluster of agents with similar agent data, such as similar demographic data or psychographic data, and further determine within that cluster an ordering of agent suitability. In this manner, the present invention can increase the efficiency of the dialer and avoid having to stop the dialer until an agent with specific agent data becomes available.

The present invention may store data specific to each routed caller for subsequent analysis. For example, the present invention can store data generated in any computer model, including the chances for an optimal interaction as predicted by the computer model, such as the chances of sales, contact durations, customer satisfaction, or other parameters. Such a store may include actual data for the caller connection that was made, including the agent and caller data, whether a sale occurred, the duration of the contact, and the level of customer satisfaction. Such a store may also include actual data for the agent to caller matches that were made, as well as how, which, and when matches were considered pursuant to connection rules and prior to connection to a particular agent.

This stored information may be analyzed in several ways. One possible way is to analyze the cumulative effect of the present invention on an optimal interaction over different intervals of time and report that effect to the contact center or the contact center client. For example, the present invention can report back as to the cumulative impact of the present invention in enhancing revenues, reducing costs, increasing customer satisfaction, over five minute, one hour, one month, one year, and other time intervals, such as since the beginning of a particular client solicitation campaign. Similarly, the present invention can analyze the cumulative effect of the present invention in enhancing revenue, reducing costs, and increasing satisfaction over a specified number of callers, for instance 10 callers, 100 callers, 1000 callers, the total number of callers processed, or other total numbers of callers.

One method for reporting the cumulative effect of employing the present invention comprises matching a caller with each agent logged in at the contact center, averaging the chances of an optimal interaction over each agent, determining which agent was connected to the caller, dividing the chance of an optimal interaction for the connected agent by the average chance, and generating a report of the result. In this manner, the effect of the present invention can be reported as the predicted increase associated with routing a caller to a specific agent as opposed to randomly routing the caller to any logged-in agent. This reporting method can also be modified to compare the optimal interaction chance of a specific agent routing against the chances of an optimal interaction as averaged over all available agents or over all logged-in agents since the commencement of a particular campaign. In fact, by dividing the average chance of an optimal interaction over all unavailable agents at a specific period of time by the average chance of an optimal interaction over all available agents at that same time, a report can be generated that indicates the overall boost created by the present invention to the chance of an optimal interaction at that time. Alternatively, the present invention can be monitored, and reports generated, by cycling the present invention on and off for a single agent or group of agents over a period of time, and measuring the actual contact results. In this manner, it can be determined what the actual, measured benefits are created by employing the present invention.

Embodiments of the present invention can include a visual computer interface and printable reports provided to the contact center or their clients to allow them to, in a realtime or a past performance basis, monitor the statistics of agent to caller matches, measure the optimal interactions that are being achieved versus the interactions predicted by the computer model, as well as any other measurements of real time or past performance using the methods described herein. A visual computer interface for changing the weighting on an optimal interaction can also be provided to the contact center or the contact center client, such that they can, as discussed herein, monitor or change the weightings in real time or at a predetermined time in the future.

An embodiment of the present invention can also comprise an intelligent routing system, the system comprising means for grading two or more agents on an optimal interaction, and means for matching a caller with at least one of the two or more graded agents to increase the chance of the optimal interaction. Means for grading an agent can comprise, as discussed herein, the use of manual or automatic surveys, the use of a computational device and database to record an agent's revenue generation performance per call, the agent's contact time per caller, or any other performance criteria that can be electronically recorded. Means for matching the caller with at least one of the two or more graded agents can comprise any computational device. The intelligent routing system can further comprise means for connecting the caller with one of the two or more agents, such as a switching system. The system can further comprise a dialer, a callerID device, and other commercially-available telephony or telecommunications equipment, as well as memory containing a database, such as a commercially available database, publicly-available database, client database, or contact center database.

In a more advanced embodiment, the present invention can be used to create an intelligent routing system, the system comprising means for determining at least one agent data for each of two or more agents, determining at least one caller data for a caller, means for using the agent data and the caller data in a pattern matching algorithm, and means for matching the caller to one of the two or more agents to increase the chance of an optimal interaction. Means for determining agent data can comprise the use of manual or automatic surveys, which can be recorded in hardcopy or electronic form, such as through the use of computer memory containing databases for storing such information. Means for determining caller data can comprise the use of computer memory containing a database with caller data, such as a commercially-available database, client database, or contact center database. Means for determining caller data can also comprise the use of a CallerID device as well as telephony or other telecommunications equipment for receiving a caller's account number or other caller-identifying information. Means for using the agent data and the caller data in a pattern matching algorithm can comprise a computational device. Means for matching the caller to one of the two or more agents can also comprise the use of a computational device. This embodiment of the intelligent routing system can also comprise means for connecting the caller with one of the two or more agents, such as a switching or routing system. The system can also comprise means for contacting a caller, such as a dialer or telephony equipment that can be used by an agent to contact the caller.

Figure 7:
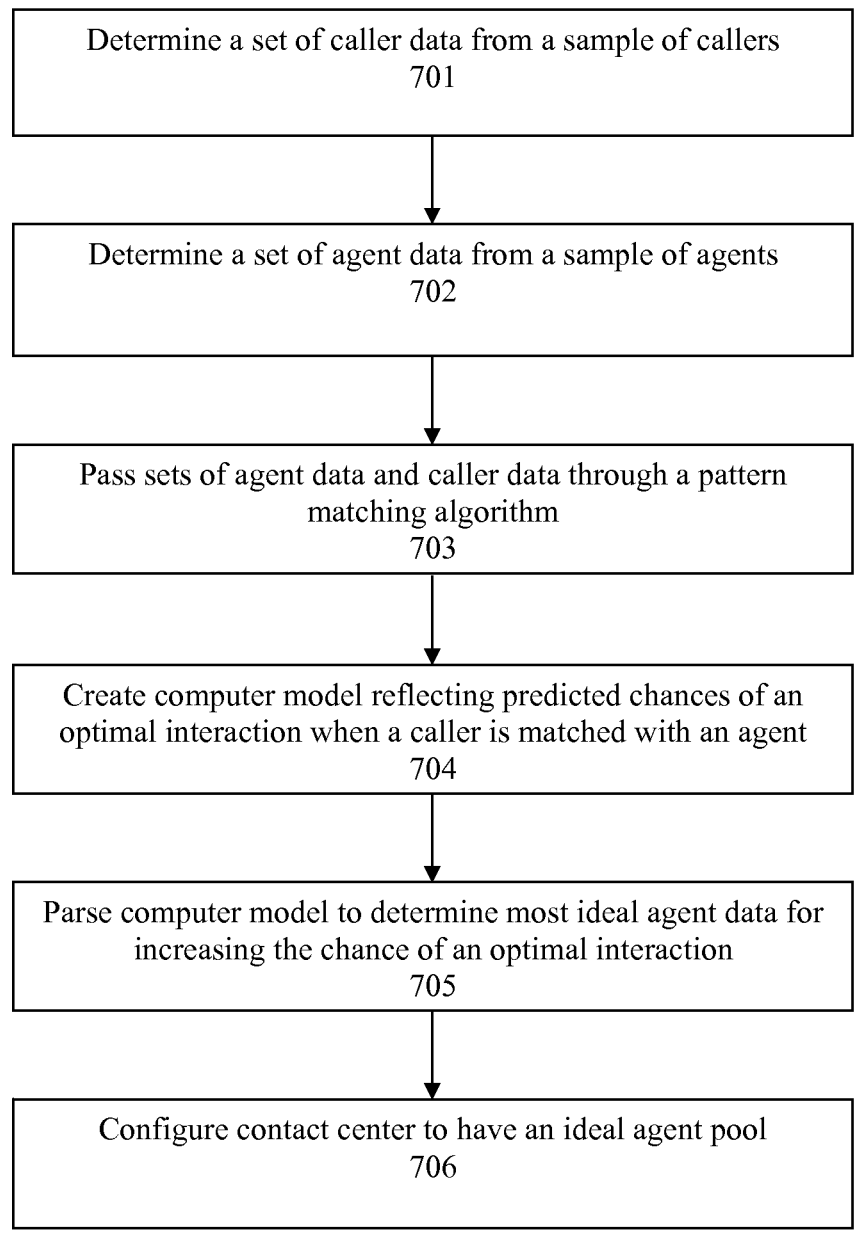
FIG. 7 is a flowchart reflecting an embodiment of the present invention for configuring an ideal agent pool.

FIG. 7 is a flowchart reflecting an embodiment of the present invention that comprises a method of identifying an agent pool to increase the chances of an optimal interaction for the contact center generally, or for specific contact center clients. By identifying an agent pool with this method, the contact center can configure an agent pool that increases the contact center's overall chances for obtaining a sale, operating at low cost, obtaining an acceptable level of customer satisfaction, or some other optimal interaction. The agent pool can also be identified and configured to increase these overall chances of a chosen optimal interaction for a specific contact center client or group of clients.

The method of identifying an ideal agent pool can comprise determining an optimal interaction, determining a set of caller data for a sample of callers, determining a set of agent data, generating a computer model for the optimal interaction with the set of caller data and the set of agent data, and identifying agent data that increases the overall chances of the optimal interaction. In step 701, a set of caller data is determined from actual caller data, predicted or theoretical caller data, or a mixture thereof. In step 702, a set of agent data is determined from actual agent data, predicted or theoretical agent data, or a mixture thereof. In step 703, the set of caller data and the set of agent data are used in a pattern matching algorithm. In step 704, a computer model is then derived that reflects the predicted chances of an optimal interaction occurring when callers with the set of caller data are matched with agents with the set of agent data.

In step 705, the computer model is then parsed to determine what agent data is most effective for an optimal interaction. In this manner, a contact center can identify that agents with such agent data are ideal for maximizing the chances of an optimal interaction for certain callers. In step 706, the contact center's operations are accordingly configured to have an ideal agent pool for a particular client, a group of clients, or for the contact center in general. This configuration can be accomplished by specifically grouping agents that the contact center has already acquired, by determining what types of agents the contact center should hire, or a mixture thereof. This embodiment can thus be particularly useful in identifying what agents to hire, transfer, or terminate. It will be appreciated that the steps outlined in the flowchart of FIG. 7 need not occur in that exact order.

Many of the techniques described here may be implemented in hardware or software, or a combination of the two. Preferably, the techniques are implemented in computer programs executing on programmable computers that each includes a processor, a storage medium readable by the processor (including volatile and nonvolatile memory and/or storage elements), and suitable input and output devices. Program code is applied to data entered using an input device to perform the functions described and to generate output information. The output information is applied to one or more output devices. Moreover, each program is preferably implemented in a high level procedural or object-oriented programming language to communicate with a computer system. However, the programs can be implemented in assembly or machine language, if desired. In any case, the language may be a compiled or interpreted language.

Each such computer program is preferably stored on a storage medium or device (e.g., CD-ROM, hard disk or magnetic diskette) that is readable by a general or special purpose programmable computer for configuring and operating the computer when the storage medium or device is read by the computer to perform the procedures described. The system also may be implemented as a computer-readable storage medium, configured with a computer program, where the storage medium so configured causes a computer to operate in a specific and predefined manner.

The above-described embodiments of the present invention are merely meant to be illustrative and not limiting. Various changes and modifications may be made without departing from the invention in its broader aspects. The appended claims encompass such changes and modifications within the spirit and scope of the invention.

The invention claimed is:
1. A method for handling contacts and agents in a contact center system comprising:
  automatically identifying, by at least one computer processor, a plurality of contacts ordered chronologically in a queue for assignment to a plurality of agents;

automatically identifying, by the at least one computer processor, information about a first agent of the plurality of agents that becomes available for assignment;

automatically assigning, by the at least one computer processor, a first out-of-order contact from the plurality of contacts to the first agent based on the information about the first agent and information about the first out-of-order contact, wherein the first out-of-order contact is a contact in the plurality of contacts that is assigned before at least one other contact of the plurality of contacts that is ordered chronologically ahead of the first out-of-order contact in the queue; and automatically connecting, by the at least one computer processor, the first out-of-order contact to the first agent.

2. The method of claim 1, wherein the plurality of contacts are ordered chronologically in the queue based on respective contact center system arrival times of each contact of the plurality of contacts.

3. The method of claim 1, wherein automatically assigning the first out-of-order contact increases an expected wait time of a first in-order contact of the plurality of contacts.

4. The method of claim 1, further comprising automatically determining that an expected improvement to a contact interaction by automatically assigning the first out-of-order contact outweighs an expected cost by keeping a first in-order contact of the plurality of contacts on hold.

5. The method of claim 1, further comprising automatically searching the plurality of contacts for an assignment based on the information about the first agent.

6. The method of claim 1, wherein the first out-of-order contact is automatically connected using an outbound dialer of the contact center system.

7. The method of claim 1, further comprising automatically assigning a second out-of-order contact from the plurality of contacts to a second agent of the plurality of agents that becomes available for assignment to any of a remainder of the plurality of contacts based on information about the second agent.

8. A system for handling contacts and agents in a contact center system comprising:

a processor communicatively coupled to the contact center system, wherein the processor is configured to:

automatically identify a plurality of contacts ordered chronologically in a queue for assignment to a plurality of agents;

automatically identify information about a first agent of the plurality of agents that becomes available for assignment;

automatically assign a first out-of-order contact from the plurality of contacts to the first agent based on the information about the first agent and information about the first out-of-order contact, wherein the first out-of-order contact is a contact in the plurality of contacts that is assigned before at least one other contact of the plurality of contacts that is ordered chronologically ahead of the first out-of-order contact in the queue; and automatically connect the first out-of-order contact to the first agent.

9. The system of claim 8, wherein the plurality of contacts are ordered chronologically in the queue based on respective contact center system arrival times of each contact of the plurality of contacts.

10. The system of claim 8, wherein automatically assigning the first out-of-order contact increases an expected wait time of a first in-order contact of the plurality of contacts.

11. The system of claim 8, wherein the processor is further configured to automatically determine that an expected improvement to a contact interaction by automatically assigning the first out-of-order contact outweighs an expected cost by keeping a first in-order contact of the plurality of contacts on hold.

12. The system of claim 8, wherein the processor is further configured to automatically search the plurality of contacts for an assignment based on the information about the first agent.

13. The system of claim 8, wherein the first out-of-order contact is automatically connected using an outbound dialer of the contact center system.

14. The system of claim 8, wherein the processor is further configured to automatically assign a second out-of-order contact from the plurality of contacts to a second agent of the plurality of agents that becomes available for assignment to any of a remainder of the plurality of contacts based on information about the second agent.

15. An article of manufacture for handling contacts and agents in a contact center system comprising:

a non-transitory processor readable medium; and instructions stored on the medium;

wherein the instructions are configured to be readable from the medium by a processor communicatively coupled to the contact center system and thereby cause the processor to operate so as to:

automatically identify a plurality of contacts ordered chronologically in a queue for assignment to a plurality of agents;

automatically identify information about a first agent of the plurality of agents that becomes available for assignment;

automatically assign a first out-of-order contact from the plurality of contacts to the first agent based on the information about the first agent and information about the first out-of-order contact, wherein the first out-of-order contact is a contact in the plurality of contacts that is assigned before at least one other contact of the plurality of contacts that is ordered chronologically ahead of the first out-of-order contact in the queue; and automatically connect the first out-of-order contact to the first agent.

16. The article of manufacture of claim 15, wherein the plurality of contacts are ordered chronologically in the queue based on respective contact center system arrival times of each contact of the plurality of contacts.

17. The article of manufacture of claim 15, wherein automatically assigning the first out-of-order contact increases an expected wait time of a first in-order contact of the plurality of contacts.

18. The article of manufacture of claim 15, wherein the processor is caused to operate further so as to automatically determine that an expected improvement to a contact interaction by automatically assigning the first out-of-order contact outweighs an expected cost by keeping a first in-order contact of the plurality of contacts on hold.

19. The article of manufacture of claim 15, wherein the processor is caused to operate further so as to automatically search the plurality of contacts for an assignment based on the information about the first agent.

20. The article of manufacture of claim 15, wherein the first out-of-order contact is automatically connected using an outbound dialer of the contact center system.

* * * * *